(12) United States Patent
Burris et al.

(10) Patent No.: US 8,842,954 B2
(45) Date of Patent: Sep. 23, 2014

(54) CABLE ASSEMBLY

(71) Applicant: Corning Cable Systems LLC, Hickory, NC (US)

(72) Inventors: Donald Andrew Burris, Peoria, AZ (US); Mark Edward Conner, Granite Falls, NC (US); Tory Allen Klavuhn, Newton, NC (US); Lars Kristian Nielsen, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/799,188

(22) Filed: Mar. 13, 2013

(65) Prior Publication Data

US 2013/0294735 A1 Nov. 7, 2013

Related U.S. Application Data

(60) Provisional application No. 61/725,767, filed on Nov. 13, 2012, provisional application No. 61/641,559, filed on May 2, 2012, provisional application No. 61/677,725, filed on Jul. 31, 2012, provisional application No. 61/701,090, filed on Sep. 14, 2012.

(51) Int. Cl.
*G02B 6/44* (2006.01)
*G02B 6/00* (2006.01)
*H04W 88/08* (2009.01)

(52) U.S. Cl.
CPC ............ *G02B 6/4415* (2013.01); *G02B 6/4416* (2013.01); *G02B 6/4471* (2013.01); *H04W 88/085* (2013.01)
USPC ............................ 385/101; 385/107; 385/135

(58) Field of Classification Search
USPC .................................................. 385/101, 107
See application file for complete search history.

(56) References Cited

U.S. PATENT DOCUMENTS

| | | | | |
|---|---|---|---|---|
| 4,820,007 | A * | 4/1989 | Ross et al. | 385/135 |
| 6,195,487 | B1 * | 2/2001 | Anderson et al. | 385/101 |
| 6,236,789 | B1 * | 5/2001 | Fitz | 385/101 |
| 7,006,739 | B2 | 2/2006 | Elkins, II et al. | 385/100 |
| 7,016,592 | B2 | 3/2006 | Elkins, II et al. | 385/136 |
| 7,127,143 | B2 | 10/2006 | Elkins, II et al. | 385/100 |
| 7,155,093 | B2 | 12/2006 | Elkins, II et al. | 385/100 |
| 7,251,411 | B1 | 7/2007 | Lu et al. | 385/147 |
| 7,317,863 | B2 | 1/2008 | Lu et al. | 385/135 |
| 7,330,621 | B2 * | 2/2008 | Elkins et al. | 385/100 |
| 7,346,243 | B2 | 3/2008 | Cody et al. | 385/100 |
| 7,349,605 | B2 | 3/2008 | Noonan et al. | 385/100 |
| 7,409,127 | B1 | 8/2008 | Hurley et al. | 385/101 |
| 7,418,177 | B2 | 8/2008 | Lu et al. | 385/100 |
| 7,422,378 | B2 | 9/2008 | Lu et al. | 385/95 |

(Continued)

FOREIGN PATENT DOCUMENTS

| | | | | |
|---|---|---|---|---|
| WO | | 2012038104 A1 | 3/2012 | |
| WO | WO 2012/038104 A1 | | 3/2012 | ............... G02B 6/44 |
| WO | WO 2013/139649 A1 | | 9/2013 | ............... G02B 6/44 |

*Primary Examiner* — Omar Rojas
(74) *Attorney, Agent, or Firm* — Russell S. Magaziner

(57) ABSTRACT

A hybrid cable assembly includes a hybrid cable, tether tubes, and an overmold. The hybrid cable includes both electrical-conductor and fiber-optic elements. The tethers receive a subset of the elements from the hybrid cable at a transition location in the form of a chamber, and the overmold surrounds the transition location. The overmold is elongate, flexible, and has a low profile configured to pass through narrow ducts.

20 Claims, 24 Drawing Sheets

(56) References Cited

U.S. PATENT DOCUMENTS

| | | | |
|---|---|---|---|
| 7,424,189 B2 | 9/2008 | Lu et al. | 385/100 |
| 7,450,804 B2 | 11/2008 | Elkins, II et al. | 385/100 |
| 7,454,106 B2 | 11/2008 | Cobb, III et al. | 385/100 |
| 7,515,796 B2 | 4/2009 | Cody et al. | 385/100 |
| 7,532,799 B2 | 5/2009 | Gronvall et al. | 385/136 |
| 7,590,321 B2 | 9/2009 | Lu et al. | 385/104 |
| 7,609,925 B2 | 10/2009 | Gronvall et al. | 385/100 |
| 7,630,606 B2 | 12/2009 | Lu et al. | 385/100 |
| 7,660,501 B2 | 2/2010 | Elkins, II et al. | 385/100 |
| 7,693,374 B2 | 4/2010 | Cody et al. | 385/100 |
| 7,729,583 B2 | 6/2010 | Elkins, II et al. | 385/102 |
| 7,756,374 B2 | 7/2010 | Cody et al. | 385/114 |
| 7,769,261 B2 | 8/2010 | Lu | 385/100 |
| 7,787,727 B2 | 8/2010 | Bringuier et al. | 385/113 |
| 7,840,109 B2 | 11/2010 | Lu et al. | 385/114 |
| 8,041,178 B2 | 10/2011 | Lu et al. | 385/147 |
| 8,059,929 B2 | 11/2011 | Cody et al. | 385/100 |
| 8,582,938 B2 | 11/2013 | Cody et al. | 385/100 |
| 2006/0056782 A1 | 3/2006 | Elkins, II et al. | 385/100 |
| 2007/0110376 A1 | 5/2007 | Buthe et al. | 385/123 |
| 2010/0080514 A1 | 4/2010 | Lu et al. | 385/76 |
| 2012/0027361 A1 | 2/2012 | Brower et al. | 385/89 |
| 2012/0134629 A1 | 5/2012 | Lu et al. | 385/77 |
| 2013/0004126 A1 | 1/2013 | Wu et al. | 385/77 |
| 2013/0146355 A1 | 6/2013 | Strasser et al. | 174/72 A |
| 2013/0251319 A1 | 9/2013 | Compton et al. | 385/99 |
| 2014/0056561 A1 | 2/2014 | Lu et al. | 385/76 |

* cited by examiner

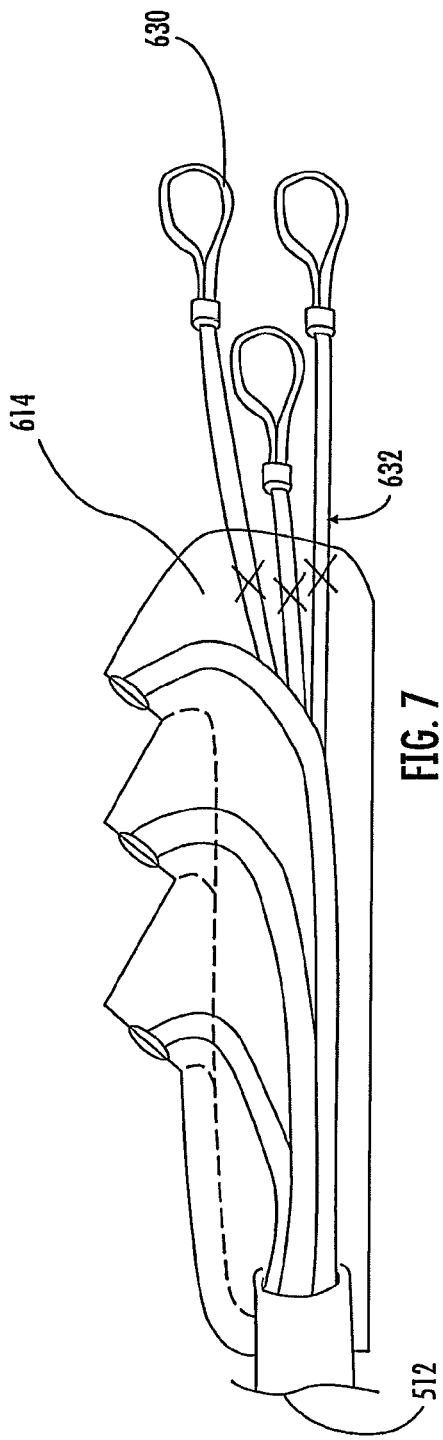
FIG. 7
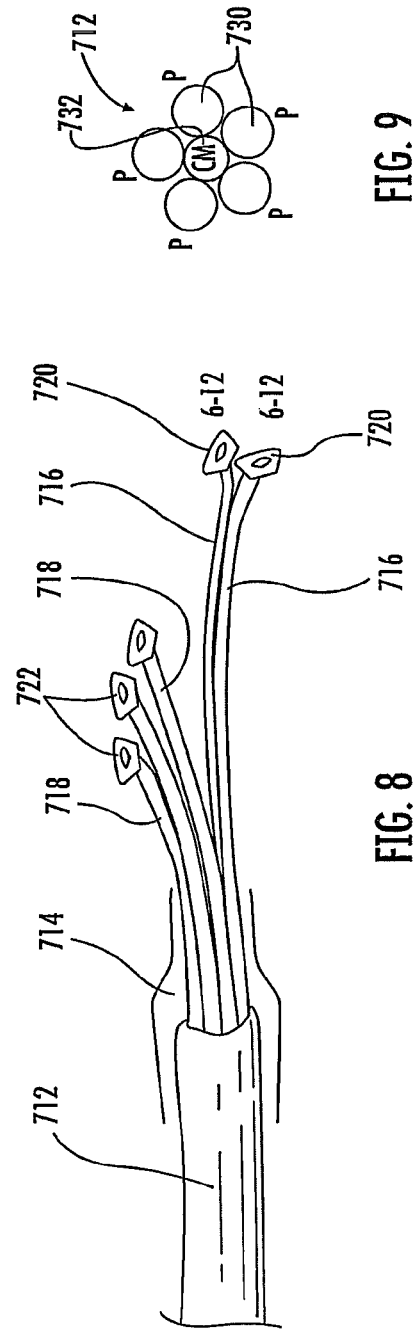
FIG. 9
FIG. 8

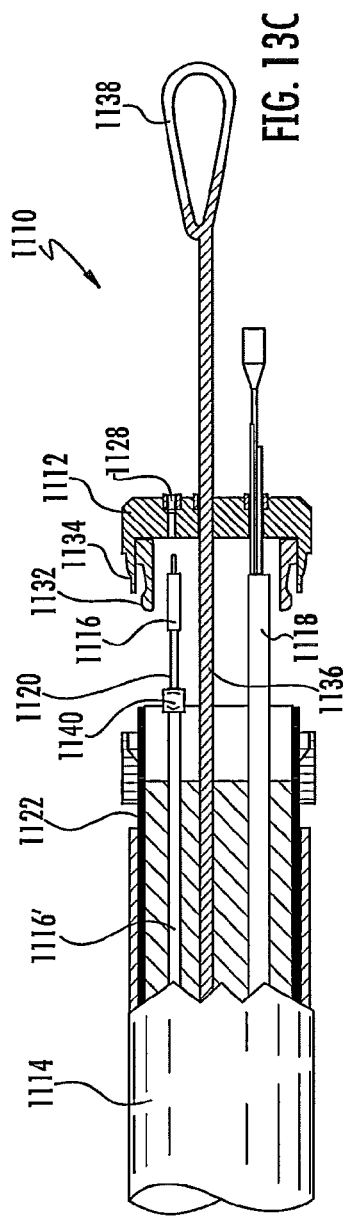
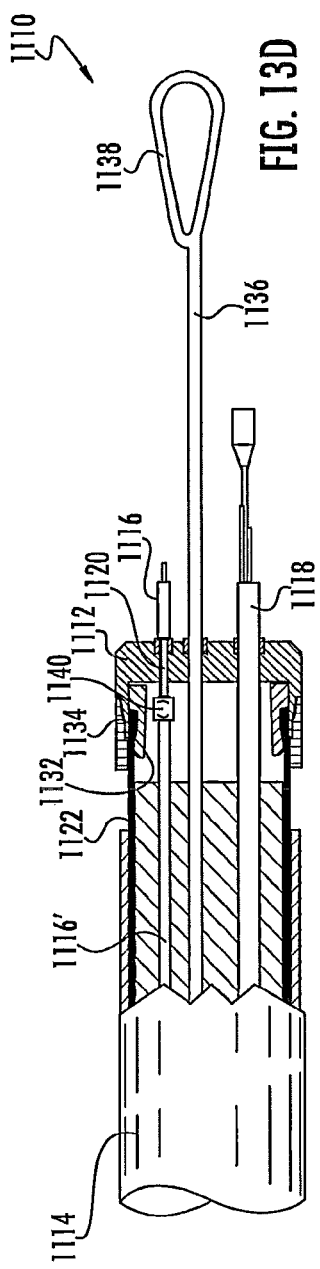
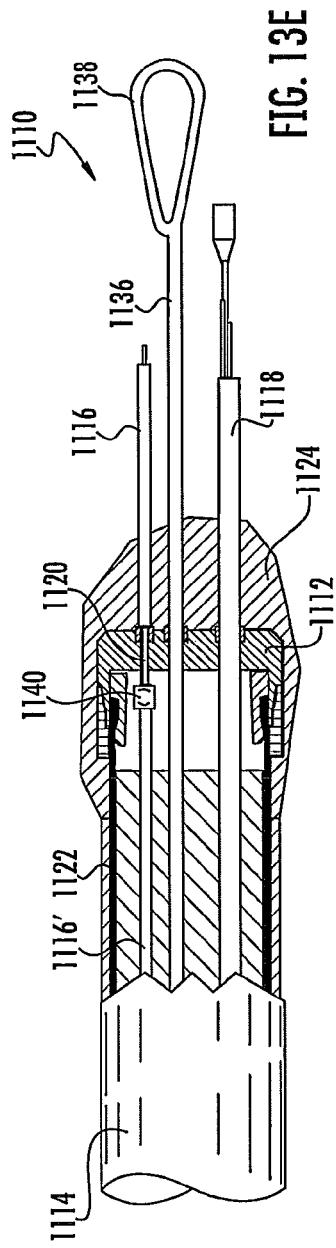

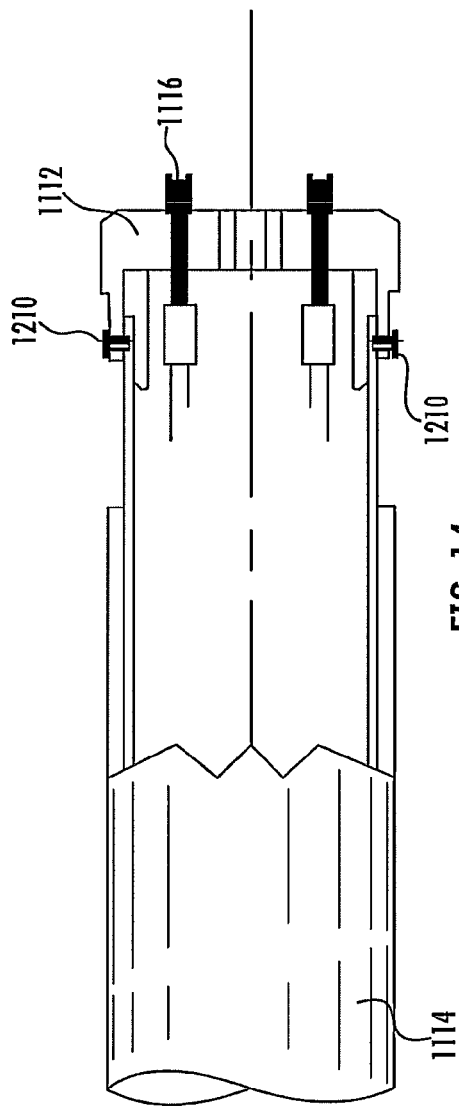
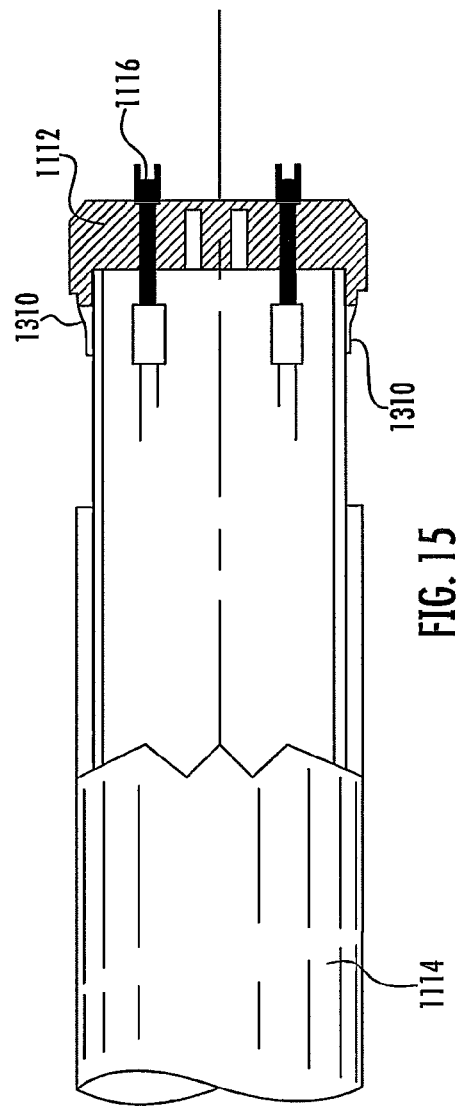

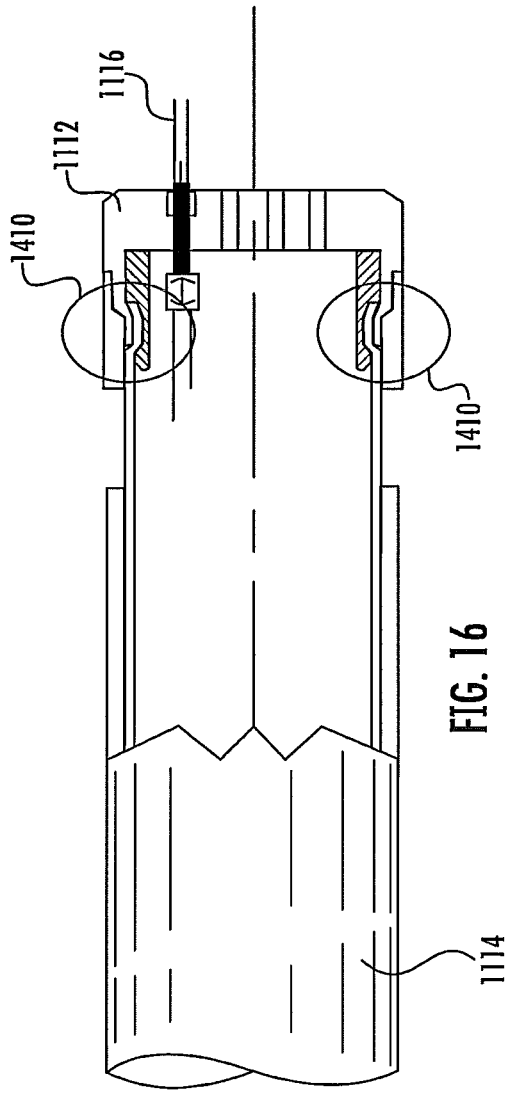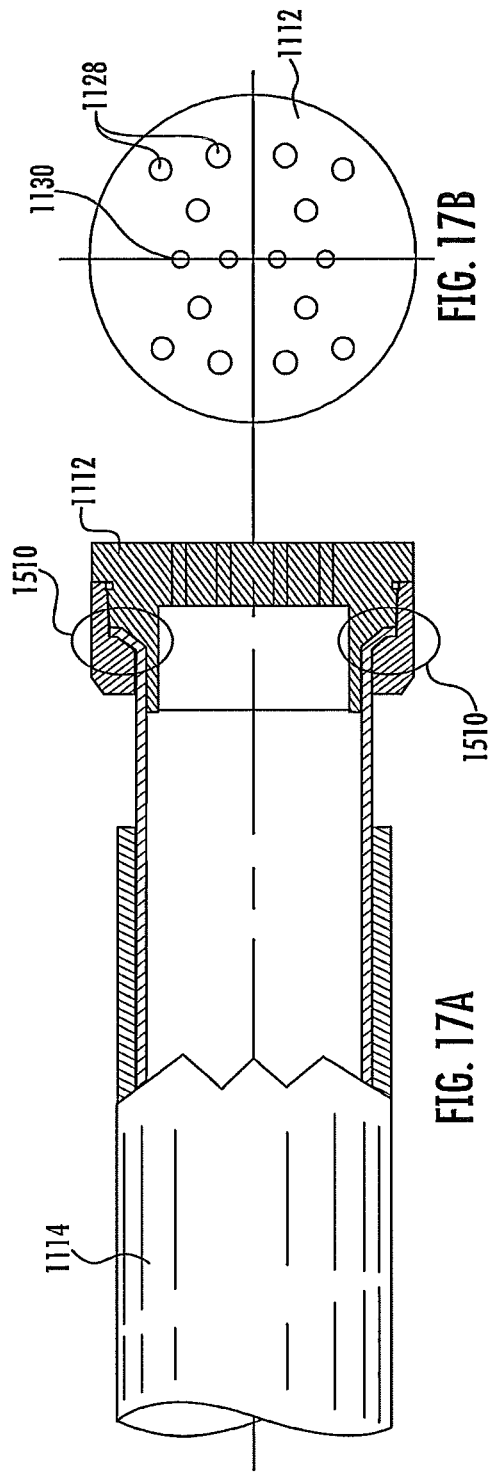

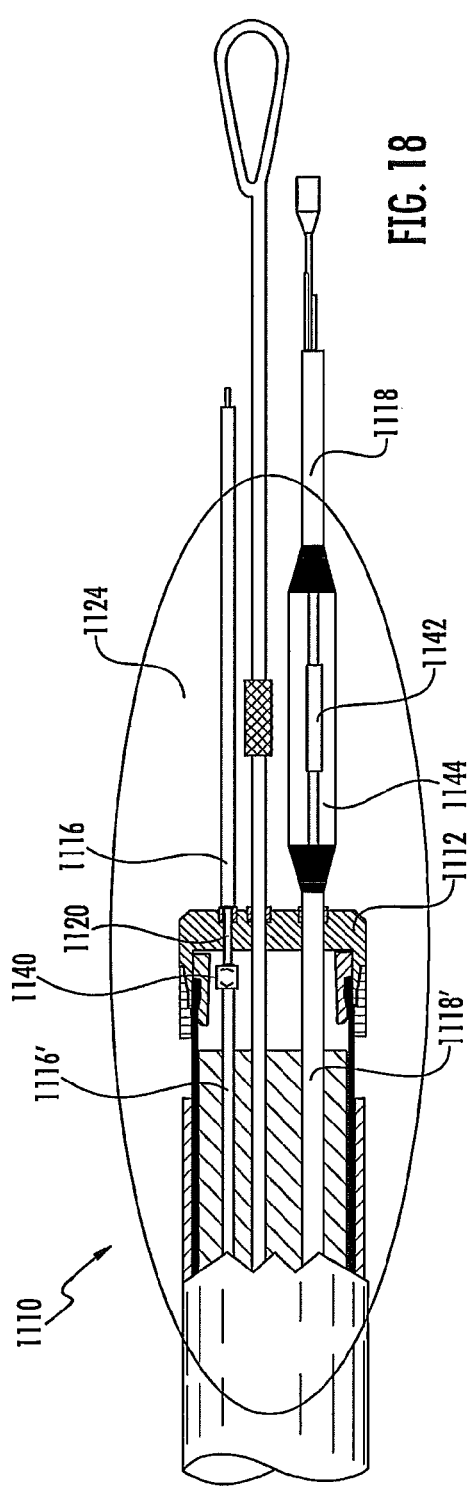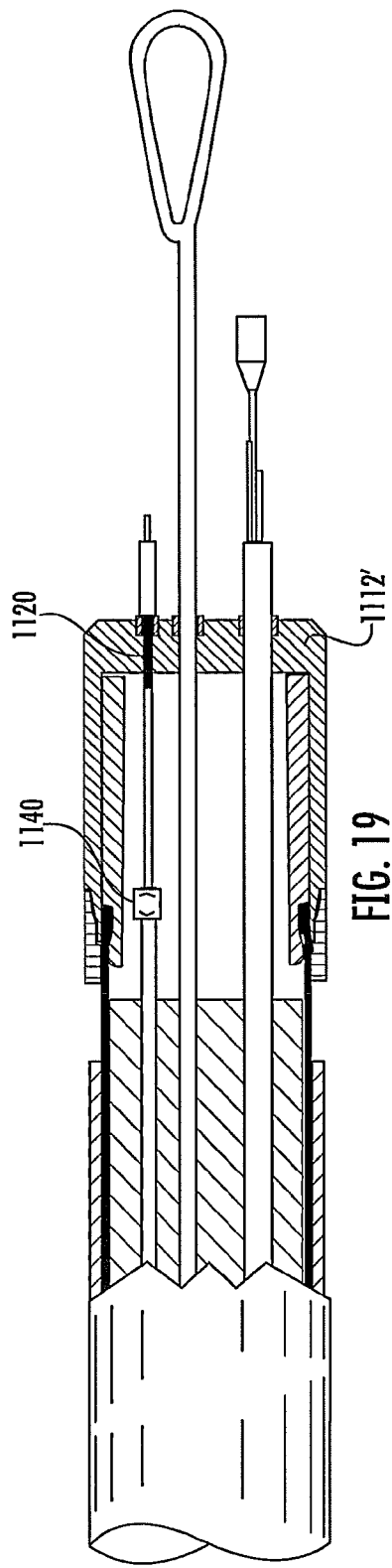

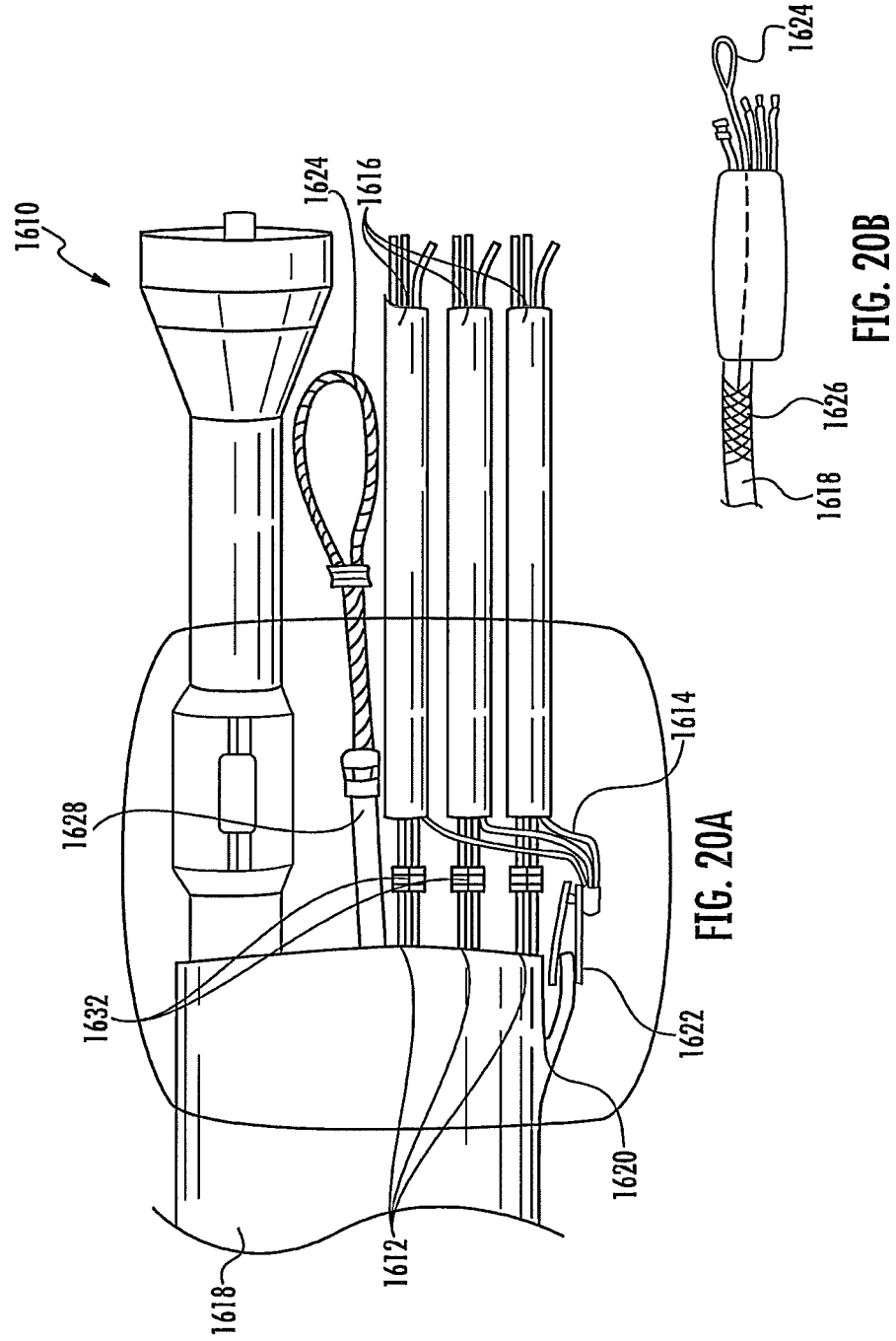

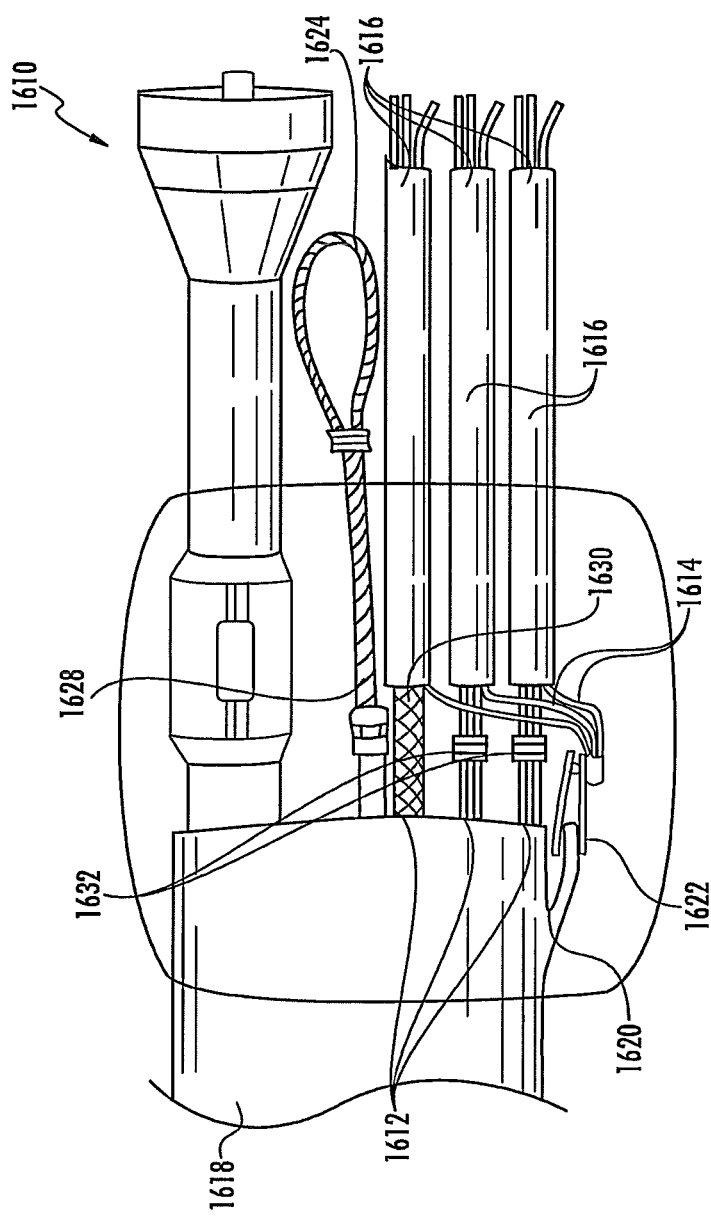

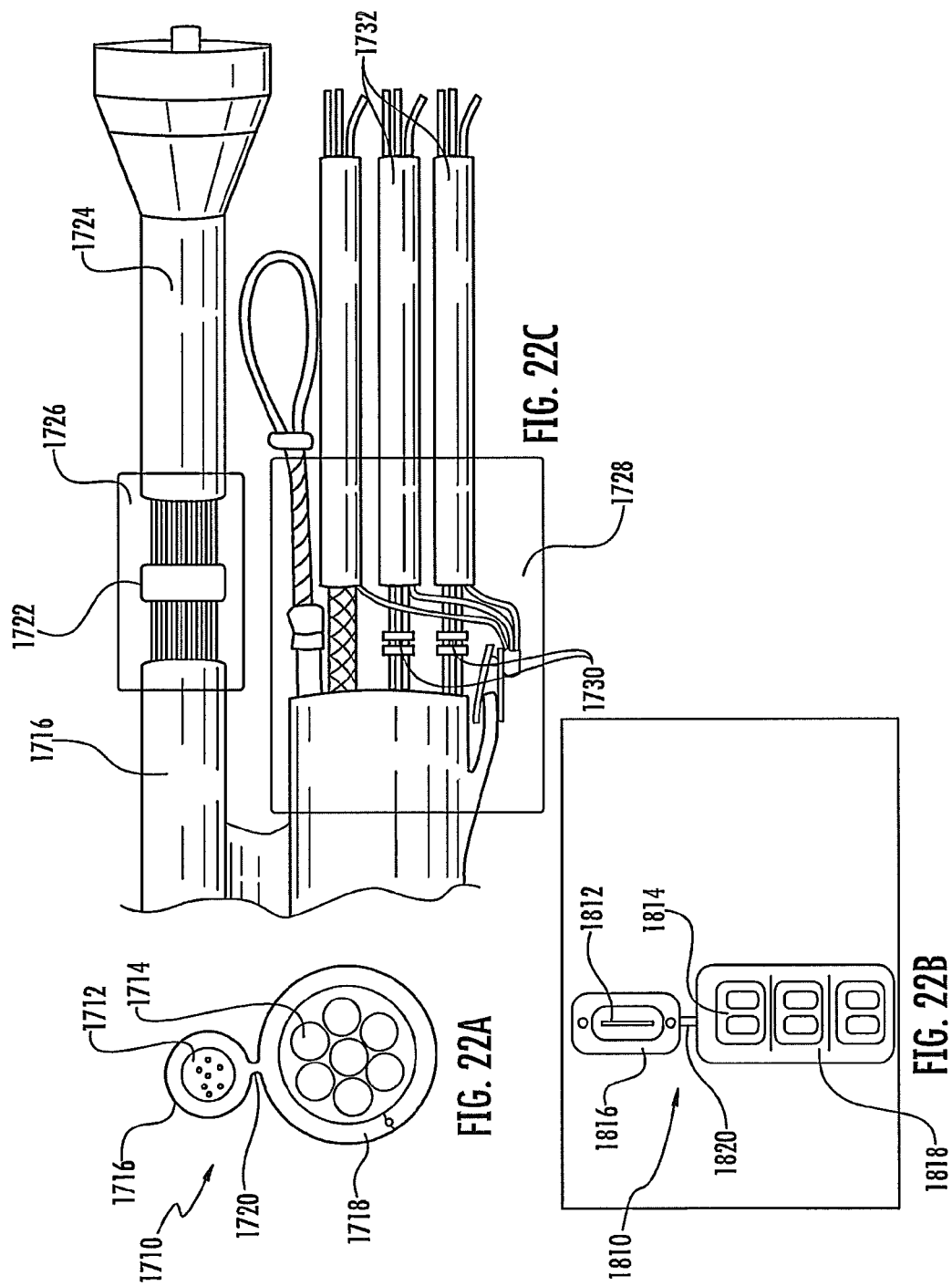

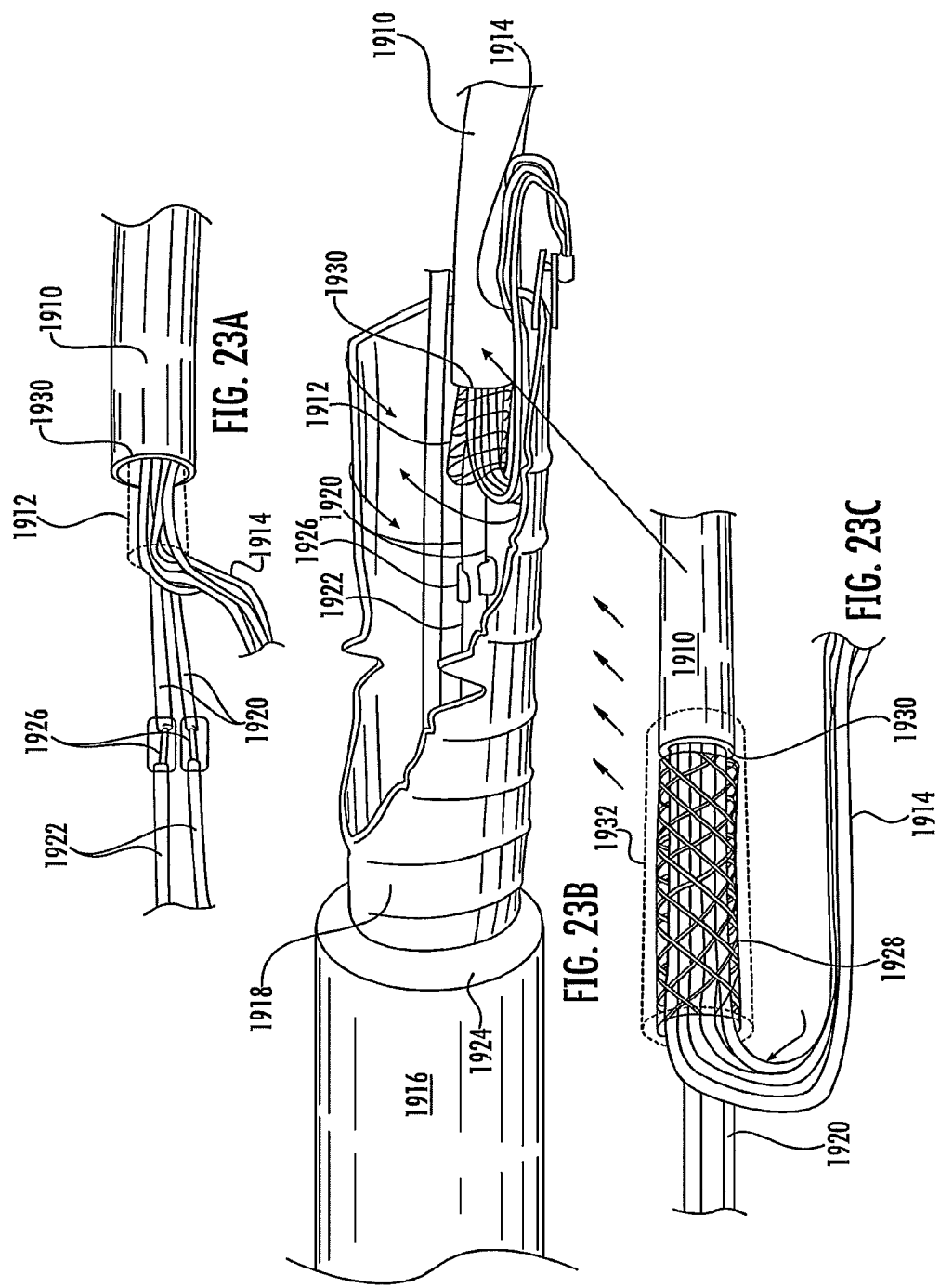

CABLE ASSEMBLY

RELATED APPLICATIONS

This application claims the benefit of priority under 35 U.S.C. §119 of U.S. Provisional Application Ser. Nos. 61/725,767 filed Nov. 13, 2012, 61/641,559 filed May 2, 2012, 61/677,725 filed Jul. 31, 2012, and 61/701,090 filed Sep. 14, 2012, the contents of each of which is relied upon and incorporated herein by reference in its entirety.

BACKGROUND

Aspects of the present disclosure relate generally to assemblies for hybrid cables that include both fiber-optic and electrical-conductor connectors, where the assemblies are configured to support fiber-to-the-antenna (FTTA) applications.

Cellular service providers may deploy Remote Radio Head (RRH) solutions throughout their antenna networks, a process that involves locating power components such as radio frequency (RF) amplifiers and transmitters at the top of the antenna (e.g., cell tower, radio tower, cell site). RRH solutions accordingly may utilize cabling arrangements that deliver both (1) power for the antenna power components (at a sufficient magnitude) and (2) the high-bandwidth capabilities of a fiber-optic cable. Accordingly, a need exists for a cabling assembly to efficiently and effectively provide power and communication elements to a transmitter from a base of an antenna tower.

SUMMARY

One embodiment relates to a hybrid cable assembly, which includes a hybrid cable (also called composite cable), tether tubes, and an overmold. The hybrid cable includes both electrical-conductor elements and fiber-optic elements that are separated from one another at least by insulation or tubing. The electrical-conductor and fiber-optic elements are stranded around a center of the hybrid cable. The tether tubes each receive a subset of the elements from the hybrid cable at a transition location, and the overmold surrounds the transition location. In some embodiments, the overmold mostly consists of polyurethane by weight, which provides flexibility to the overmold. Further, the overmold may be elongate, having a length at least five times the largest transverse cross-sectional dimension of the overmold, which provides the overmold with a low profile and flexibility configured to pass through narrow ducts.

Another embodiment relates to cable assembly, which includes a hybrid cable, fiber-optic tethers, electrical tethers, and a chamber. The hybrid cable includes electrical-conductor elements including wire conductors, fiber-optic elements including optical fibers, and conductive armor providing a ground path of the hybrid cable. The fiber-optic tethers include optical fibers optically coupled to (e.g., spliced to or continuations from) the optical fibers of the hybrid cable. The electrical tethers are coupled to the electrical-conductor elements of the hybrid cable, where the electrical tethers include a conductive shielding surrounding wire conductors electrically connected to the wire conductors of the hybrid cable. Within the chamber, the wire conductors of the electrical tethers are coupled to the electrical-conductor elements of the hybrid cable and the optical fibers of the fiber-optic tethers are optically coupled to the optical fibers of the hybrid cable. Further, conductive structure of the chamber electrically connects the conductive shielding of the tethers to the conductive armor of the hybrid cable, thereby providing grounding for the assembly.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 7 is a schematic diagram of a hybrid multi-port including electrical power ports and fiber-optic tether legs extending from the multi-port according to an exemplary embodiment.

FIG. 8 is a schematic diagram of a hybrid cable assembly including both fiber optic and electrical power tethers (e.g., extensions) according to an exemplary embodiment.

FIG. 9 is a sectional view of a cable according to an exemplary embodiment.

FIGS. 13A-E are top-down partial-sectional views of a system for grounding tethers of the network access point in various stages of assembly according to an exemplary embodiment.

FIGS. 14-17A are top-down partial-sectional views of systems for grounding tethers of the network access point according to other exemplary embodiments.

FIG. 17B is a front view of an end cap of the system of FIG. 17A.

FIGS. 18-19 are top-down partial-sectional views of systems for grounding tethers of the network access point according to still other exemplary embodiments.

FIGS. 20A-22C are schematic diagrams of cables and network access points according to exemplary embodiments.

FIGS. 23A-25B are schematic diagrams of components of a system for grounding a network access point according to an exemplary embodiment.

DETAILED DESCRIPTION

Before turning to the Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
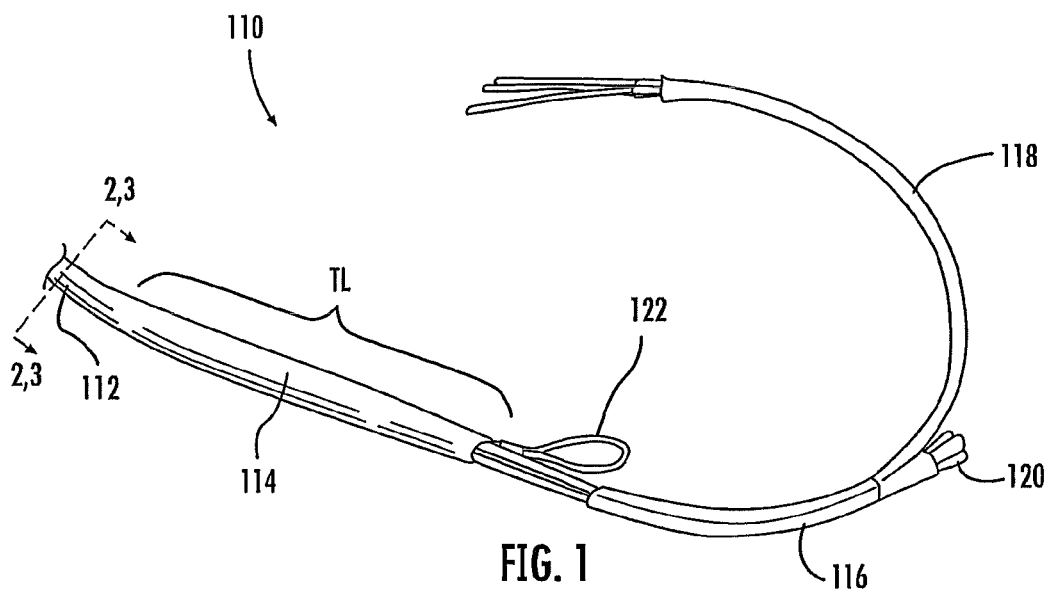
FIG. 1 is a side perspective view of a flexible, overmolded network access point for a hybrid fiber-optic and electrical-conductor cable according to an exemplary embodiment.
Figure 2:
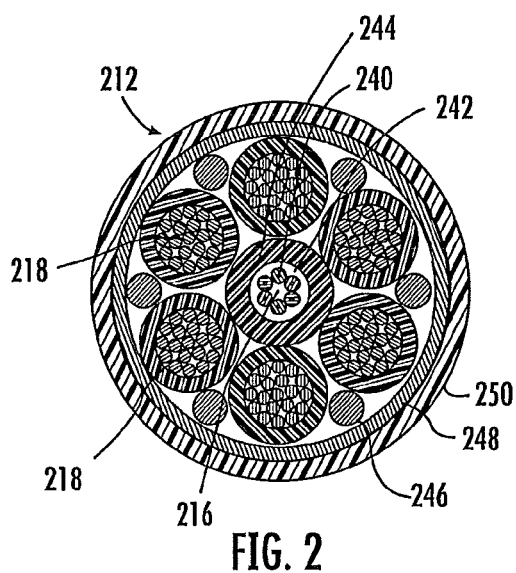
FIG. 2 is a sectional view of a hybrid cable taken along line 2-2 as shown in FIG. 1, according to an exemplary embodiment.
Figure 3:
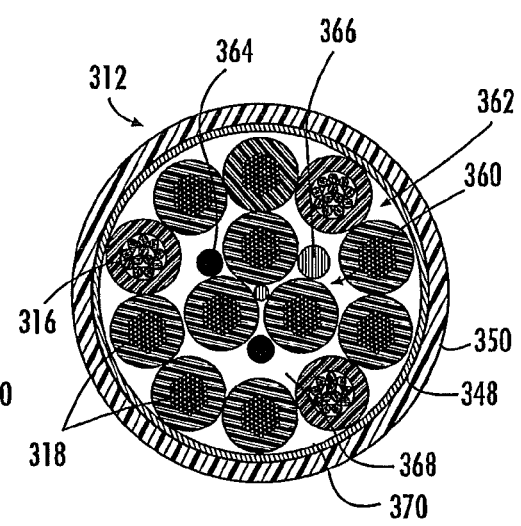
FIG. 3 is a sectional view of an alternate hybrid cable taken along line 3-3 as shown in FIG. 1, according to another exemplary embodiment.

Referring to FIG. 1, a hybrid cable assembly 110 includes a hybrid cable 112 (e.g., distribution cable) with an overmold 114 (e.g., over-molded closure) and three fiber-optic tethers 116 plus three electrical-conductor tethers 118 (e.g., sets of power leads), which are bundled together. The hybrid cable 112 includes both electrical-conductor and fiber-optic elements that are separated from one another at least by insulation or tubing (see, e.g., electrical-conductor and fiber-optic elements 218, 216, 318, 316 of hybrid cables 212, 312 as shown in FIGS. 2-3). According to an exemplary embodiment, the fiber-optic tethers are connectorized, meaning they include fiber optic connectors 120 on distal ends thereof (e.g., OptiTip™ connectors manufactured by Corning Cable Systems, SC connectors, or other connectors).

According to an exemplary embodiment, the assembly 110 includes a transition location TL (e.g., access point) having an opening (not shown) in the hybrid cable 112 to access optical fibers (see, e.g., tight-buffered fibers 240 in optical elements 216, 316 as shown in FIGS. 2-3) for splicing. In some embodiments, the opening is approximately twelve inches long along the length of the cable 112, as more fully explained in U.S. Provisional Application Nos. 61/623,875 filed Apr. 26, 2012 and 61/755,580 filed Jan. 23, 2013, each of which is incorporated by reference herein in its entirety. Optical fibers carried by the hybrid cable 110 may be spliced to optical fibers of the tethers 116 and the corresponding splice points (e.g., splices) may be inserted within a cavity 242 of the hybrid cable 212 that is at least partially surrounded by a jacket or tubing 244 of the hybrid cable 212 (see FIG. 2). The overmold 114 may then be molded around the splice point and an end of the tether 116 to secure the transition location TL. In other embodiments, the opening is on an end of the cable 112.

According to an exemplary embodiment, the overmold 114 surrounds the transition location, forming a water-tight, weather-able seal enclosing the transition location. The overmold, in some embodiments, is formed mostly from polyurethane by weight (e.g., at least 50% by weight, at least 80% by weight; consisting essentially of polyurethane), which provides flexibility to the overmold. In other embodiments, other flexible polymers may be used for the overmold material (e.g., rubber, a polymerization of monomers, such as isoprene, 1,3-butadiene, chloroprene, and isobutylene with isoprene for cross-linking) Furthermore, the overmold 114, in some embodiments, is elongate, having a length aligned with the cable 112 at least five times the largest cross-sectional dimension of the overmold 114 orthogonal to the length, such that the overmold 114 has a low profile configured to pass through narrow ducts in an antenna or other configuration.

In some embodiments, the overmold 114 has a length aligned with the lengthwise access of the hybrid cable 112 that is at least five times as great as the largest cross-sectional dimension of the overmold 114 orthogonal to the length (i.e., width or height transverse to the length). Furthermore, in some embodiments, the largest cross-sectional dimension of the overmold 114 orthogonal to the length (i.e., width or height) is less than five times the hybrid cable 112 diameter, which may be at least 10 mm and/or less than 35 mm depending upon the components of the hybrid cable 112, or may have another diameter. In some embodiments, the largest cross-sectional dimension of the overmold 114 orthogonal to the length (i.e., width or height) is less than 5 inches (e.g., less than 3 inches, less than 2 inches, less than 1.25 inches (or the metric equivalent distances)), such that the overmold is capable of passage through a correspondingly-sized-diameter round duct or opening.

Use of a low-profile, flexible-style overmold 114 (e.g., enclosure, breakout) has several advantages for use in monopole and tower applications (i.e., antenna applications). In monopole applications the interior space is often congested with existing cables and structural components. The long, slender overmold 114 design minimizes size, allowing the assembly 110 to fit in very confined places. The flexible design enables the assembly 110 to wind through the congested space.

A support loop or hook, such as a pulling eye 122, is attached to a strength member of the hybrid cable at a location that allows the pulling eye 122 to extend out of the end of the overmold 114. The tethers 116, 118 also extend out of the end of the flexible closure 114 adjacent to the pulling eye 122 and opposite to that of the hybrid cable 112. The pulling eye 122 speeds up deployment in an antenna, and can also be used for fixing the assembly 110 to an antenna tower (see FIG. 10). Molding the flexible overmold 114 to the hybrid cable 112 and tethers 116, 118 provides a weather-resistant capability that prevents ingress of water, dust, etc. into the hybrid cable 112, transition location TL, and tethers 116, 118. Additives or bonding agents (e.g., ethylene-acrylic acid, maleic anhydride, etc.) may be used to improve adhesion between the overmold 114 and other components such as the cable jacket 250, 350.

Figure 12:
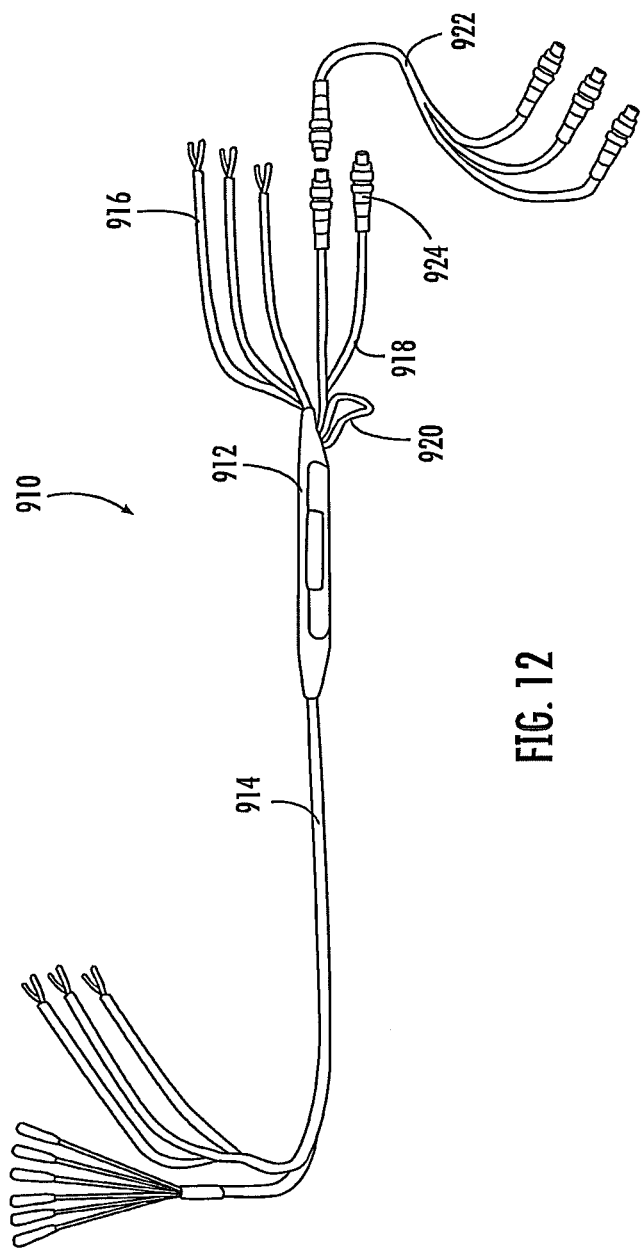
FIG. 12 is a side perspective view of the network access point of FIG. 1 and an optical interconnect cable assembly according to an exemplary embodiment.
Figure 13A:
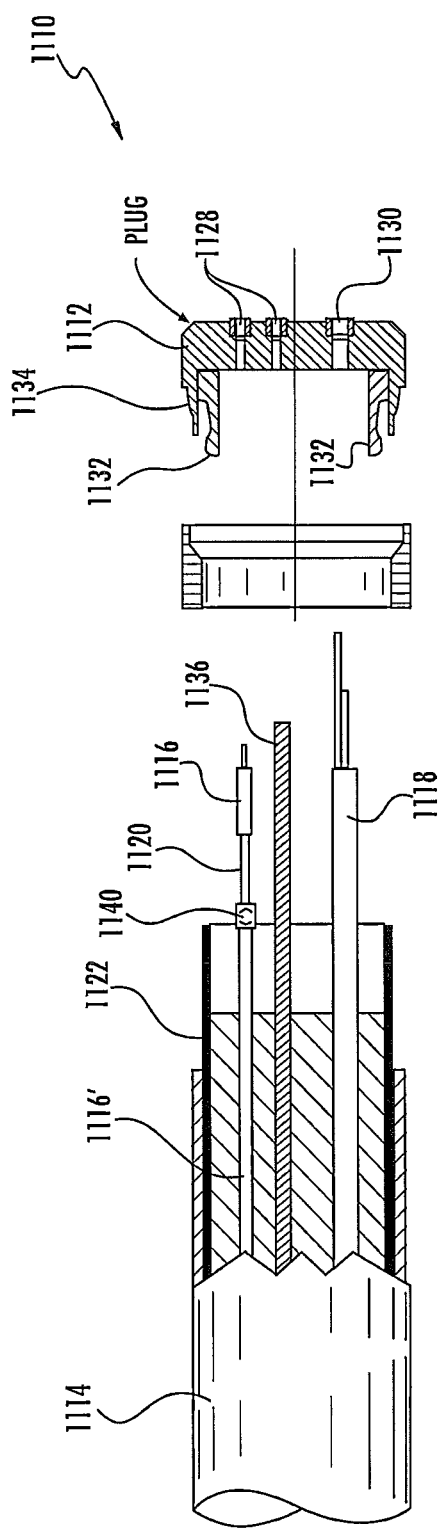
Figure 13B:
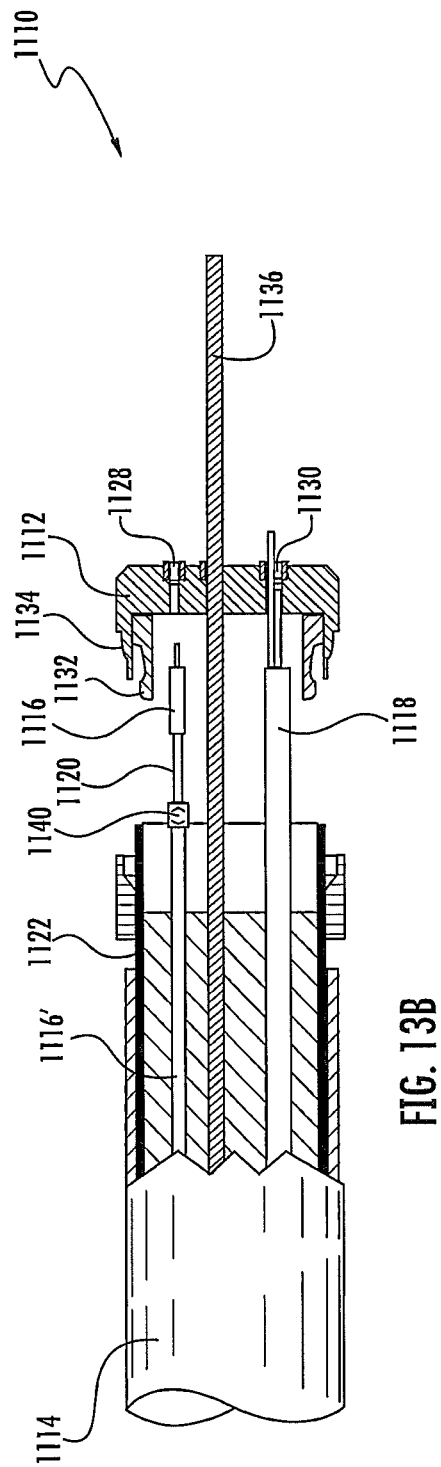

According to an exemplary embodiment, the connectors 120 are high-fiber-count optical connectors (i.e., multi-fiber connectors; e.g., supporting at least six optical fibers) and the assembly 110 includes a single fiber-optic tether 116. The high-fiber-count connector 120 can be mated to a harness cable (see, e.g., assembly 922 as shown in FIG. 12) that subsequently breaks out to three or more radio heads (e.g., transmitters; see FIG. 29). Such an arrangement reduces costs by having a single connection point on the vertical assembly 110, and also reduces the amount of time and effort needed to make connections at the top of the tower (see FIG. 10) proximate to the radio heads (see FIG. 29). Furthermore, incorporation of both electrical-conductive (e.g., stranded copper, aluminum) and optical fiber elements (e.g., ribbon, loose-tube, tight-buffered fibers) into the hybrid cable (see elements 216, 218 of cable 212, as shown in FIG. 2) reduces lease costs by having a single cable running up the tower. Use of hardened fiber optic connectors 120 obviates the need for a standard-style closure (see FIG. 28), allowing the more flexible and lower-profile overmold 110. The low-profile overmold design (i.e., "bulge in cable") may also reduce lease costs because such an overmold 110 may not even be viewed as a "closure" in a lease agreement.

Referring to FIG. 2, a hybrid cable 212 includes elements 218 stranded around a center of the hybrid cable 212, such as around a central guide 216. The elements 218 include stranded copper conductors (e.g., 8 AWG) insulated in polyvinyl chloride (PVC) jackets or another polymeric material, such as fire-retardant (FR) polyethylene (PE). The diameter of the cable (i.e., outer diameter of the radial cross-section, as shown in FIG. 2) is less than 20 mm, but may also be greater than 10 mm. The central guide 216 of the cable provides an exterior surface for stranding the elements 218, and also includes optical fiber elements 240 in the form of tight-buffered optical fibers (see also FIG. 3) within a polymeric tube 244 (e.g., outdoor-rated PVC jacket). According to an exemplary embodiment, the optical fibers of the guide 216 are stranded about a center of the cable 212, which improves communication performance of the optical fibers 240 at least by reducing optical signal attenuation due to stresses on the optical fibers 240 associated with the cable 212 in bending.

According to an exemplary embodiment, aramid or other strength members may be included within the tube 244. Filler rods 246 are positioned in the interstitial spaces between stranded elements 218 and armor 248 surrounds the elements 114. According to an exemplary embodiment, the armor 248 may be a corrugated steel, copper, or aluminum armor, which also serves as a ground conductor and/or an electro-magnetic interference (EMI) shield. Exterior to the armor 248, the cable 212 includes a polymeric jacket 250 (e.g., PE, FR PE, medium density PE, zero-halogen polymer, outdoor PVC). In various alternate embodiments, the conductors 116 are relatively high-capacity conductors, in the range of 10 AWG to 1/0 AWG (e.g., 8 gauge, 6 gauge), which provides a large electrical capacity for powerful electrical equipment (e.g., cell site, radar, other FTTA applications).

As shown in FIG. 2, in at least one preferred embodiment, the fiber optic tube 244 and optical components (i.e., fibers 240 or ribbons) extend through the central guide member 216, and the conductors 218 are stranded about the central guide member 216. A benefit for such an arrangement is that the fiber optic tube 244 may be sized, such as via polyethylene up-jacketing, to provide improved spacing between the conductors 218 that are stranded about the central member 216. The stranded conductors 218, in turn, provide the strength component to the cable 212, so that the central member 216 need not be a strength member.

Referring now to FIG. 3, a hybrid cable 312 includes first and second layers 360, 362 of stranded elements 318, 316, where some of the elements are electrical-conductor elements 318 and others of the elements are fiber optic elements 316. The cable 312 is greater than 30 mm in diameter, but less than 40 mm in diameter due to the compact configuration of stranded elements 318, 316; and includes ten 6 AWG conductors 318, as well as three 12-fiber fiber optic subunits 316. Two 18 AWG conductors 364 and a filler rod 366 are positioned within the interstitial spaces surrounding the first layer 360, below a water-blocking tape 368. Water-blocking tape 370 also surrounds the second layer 362, beneath copper armor 348, which serves as a particularly strong EMI shield below a polymeric jacket 350. Components and features (e.g., guide 216 containing optical fibers 240; waterblocking tape 368, 370, etc.) of the cable 212 may be used with the cable 312 and vice versa, as would be within the capability of one skilled in the art.

Applicants have discovered that sizing the diameters of the fiber-optic elements 316 to be close in size (e.g., within 20-percent of the diameter) to that of the (largest) insulated conductors 318 allows for improved stranding of both elements 316, 318 about a center of the cable 312. In a preferred embodiment, the stranded elements 316, 318 (i.e., both fiber optic tubes and insulated conductors) are stranded in groups of about seven-mod-six (e.g., 7, 13, 19, 25, with one of the elements in the center), which allows for an even distribution of the elements 316, 318 about the cable center, reducing shifting of the elements 316, 318 or asymmetry in the cable 310. In some embodiments, multiple layers 360, 362 of stranded elements 316, 318 are included in the cable 310, where the outer layer(s) 362 are stranded about the inner layer(s) 360, and where fiber-optic elements 316 may only be in the outermost layer 362 for ease of access.

A method of manufacturing the cable assembly of FIG. 1, with a cable according to FIG. 2 or 3, includes removing about 5-6 feet of the jacket 250, 350 and armor 248, 348 of the cable 212, 312, bundling conductor elements 218, 318 (e.g., power leads) in pairs with a UV-resistance tube or heat shrink, and cutting the optical fibers extending from the cable to approximately eight inches in length. The optical fibers are then prepared and spliced into fibers of a tether 116. The pulling eye 122 is attached to a strength member of the distribution cable (e.g., aramid fibers, glass-reinforced plastic rods (e.g., rods 246)) and the overmold 114 is then molded over the transition location TL (see FIG. 1). The fiber-optic and conductor tethers 116, 118 may then be bundled up to ease installation, as shown in FIG. 1.

Figure 4:
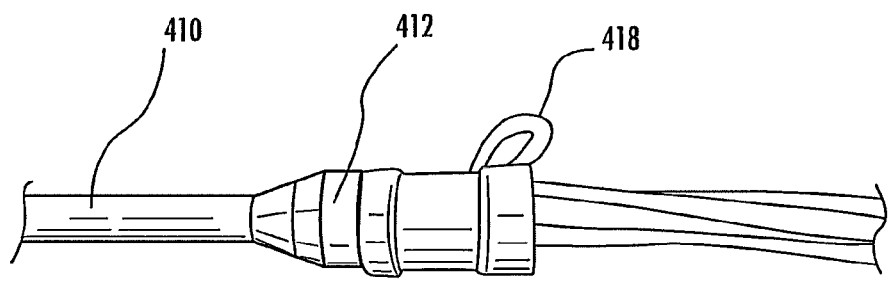
FIG. 4 is a side perspective view of a furcation body for a hybrid cable according to an exemplary embodiment.
Figure 5:
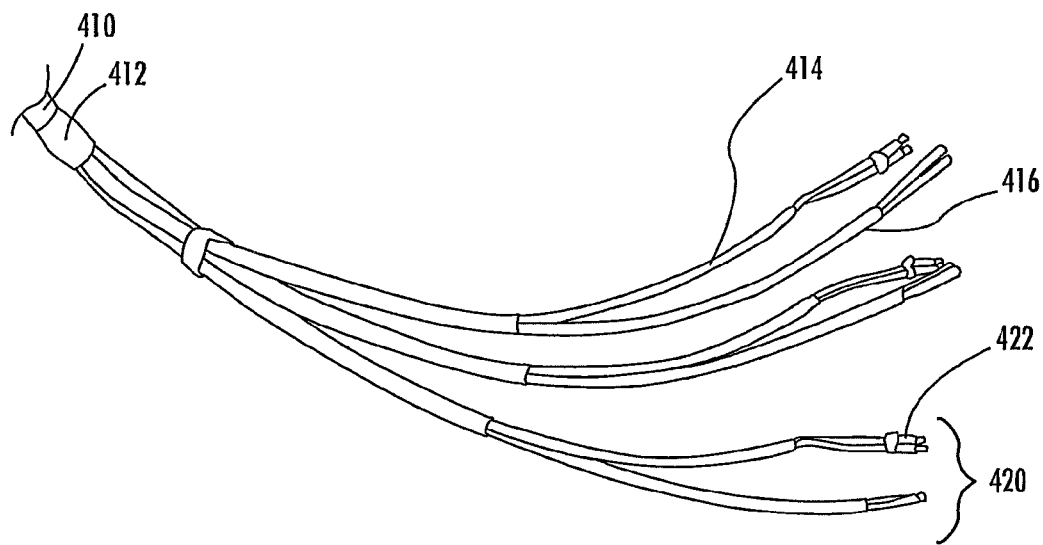
FIG. 5 is a side perspective view of hybrid fiber-optic and electrical-conductor tether legs extending from the furcation body of FIG. 4 according to an exemplary embodiment.

Referring now to FIGS. 4-5, an alternate assembly solution includes a hybrid cable 410 with a fan-out plug 412 having at least one fiber-optic tether 414 plus at least one electrical-conductor tether 416 (e.g., set of power leads). The plug 412 may include an integral pulling eye 418. According to an exemplary embodiment, the fan-out plug 412 is built on a hybrid distribution cable 410 with multiple tether pairs 420 (e.g., fiber/power bundles) extending out from the plug 412. The tether pairs 420 include optical-fiber-only tethers 414 bound to electrical-conductor-only tethers 416. In some embodiments, the optical-fiber-only tethers are connectorized, where FIG. 5 shows LC-duplex connectors 422 for example.

According to such an embodiment, the fan-out plug 412 may then be overmolded, as shown in FIG. 1, where the optical fiber portion of the hybrid cable 410 is directly connectorized. As such, fan-out components (e.g., furcation tubes, LC-connectors, binders, etc.) are added to elements (e.g., elements 316, 318) of the hybrid cable 410. In some embodiments, the elements simply pass through the fan-out plug 412 and are not separate elements spliced onto elements of the hybrid cable 410. To manufacture such an assembly, the cable sheath or jacket/armor (e.g., jacket/armor 348, 350 in FIG. 3) at the end of the hybrid cable 410 is removed for approximately 5-6 feet, the electrical-conductor elements (e.g., power leads) and fiber-optic elements are then bundled in pairs 420 with a UV resistance tube or heat shrink, and fiber optic connectors 422 are attached to the optical fibers. The fan-out plug 412 is assembled and the tethers 414, 416 are bundled to ease installation in an antenna or other arrangement.

Figure 6:
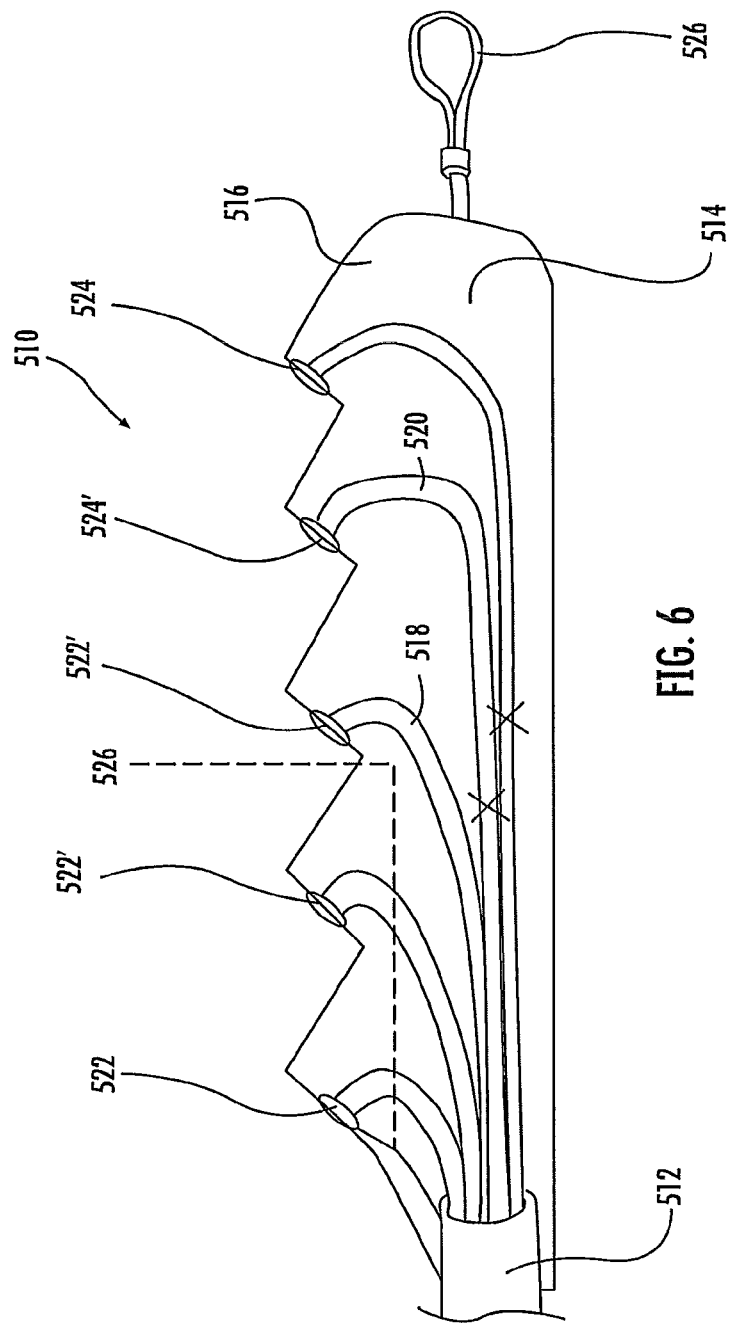
FIG. 6 is a schematic diagram of a hybrid multi-port including both fiber optic and electrical power ports according to an exemplary embodiment.

Referring now to FIG. 6, a hybrid cable assembly 510 includes a hybrid cable 512 and a multi-port 514. The hybrid cable 510 includes both electrical-conductor and fiber-optic elements 518, 520 that are separated from one another at least by insulation or tubing, as shown in FIGS. 2-3 for example. The multi-port 514 includes a single, solid housing 516 and receives the electrical-conductor 518 and fiber-optic elements 520. The multi-port 514 further includes a first port 522 integrated with the housing 516 that is solely for communicating electrical power via one or more of the electrical-conductor elements 518. The first port 522 also includes a grounding wire 526 coupled to armor (e.g., armor 348 as shown in FIG. 3) of the hybrid cable 512.

In some embodiments, the multi-port 514 includes a second port 524 integrated with the housing 516 that is solely for optical communication via one or more of the fiber-optic elements 520, where the first and second ports 522, 524 are discrete and spaced apart from one another on the multi-port 514. In some embodiments, including the first and second ports 522, 524, the multi-port 514 includes ports 522, 522' integrated with the housing 514 that are solely for communicating electrical power and ports 524, 524' integrated with the housing 514 that are solely for optical communication. In some embodiments, the ports 522, 522' solely for communicating electrical power are located on a half of the housing opposite to the location of the ports 524, 524' solely for optical communication. A hook or loop 526 may be connected to an end of the housing 514, and the ports 522, 524 may be aligned with one another on a lateral side of the housing (orthogonal to the loop 526 and cable 512) facilitating ease of placement and access to the ports 522, 524 when the multi-port 514 is hung via the loop 526.

Referring to FIG. 7 a multi-port 614, similar to the multi-port 514 and including components thereof, has a fiber-optic tether 630 extending from the end thereof opposite to that of the cable 512. In some embodiments, the fiber optic tether 630 includes an fiber-optic element of the hybrid cable, which passes through the housing of the multi-port 614. In other embodiments, an optical fiber (e.g., six- or twelve-fiber ribbon) in the fiber-optic tether 630 is spliced to an optical fiber of the hybrid cable 512, and the corresponding splice point 632 is located in the housing of the multi-port 614, providing protection to the splice point 632.

Referring to FIGS. 8-9, a break-out 710, similar to the assembly shown in FIGS. 4-5 and including components thereof, where the break-out 710 includes a hybrid cable 712, a fan-out plug 714, and fiber-optic and electrical-conductor tethers 716, 718 extending from the plug 714. The fiber-optic tethers 716, 718 may each include fiber optic ribbons, such as six- or twelve-fiber ribbons. Connectors 720, 722 may be attached to the ends of the tethers 716, 718. FIG. 9 conceptually shows a cross-section of the cable 712, with five power elements 730 stranded about a central member 732, which may include optical fibers (see also FIG. 2).

Some embodiments disclosed herein are targeted for fiber-to-the-antenna applications (FTTA). Such embodiments combine power and fiber connectivity into one weather-resistant device in a way that minimizes size. One such embodiment uses a composite cable flexible network-access-point assembly (see, e.g., assembly 110 as shown in FIG. 1) that provides access to power and fiber components of a hybrid distribution cable (see, e.g., cables 212 and 312 as shown in FIGS. 2-3). Both fiber-optic tethers and electrical-conductor tethers (also called power leads) protrude out the end of the flexible closure. An integrated pulling grip may be embedded into the assembly. Others solutions use break-out points on the cable (see FIGS. 4-5 and 8) to fan-out the power and fiber elements of the cable for termination. Embodiments disclosed herein, such as assembly 110 create a low-profile closure, including at least one tether 118, 120, where the assembly is 1.25 to 2 inches in widest diameter.

Figure 10:
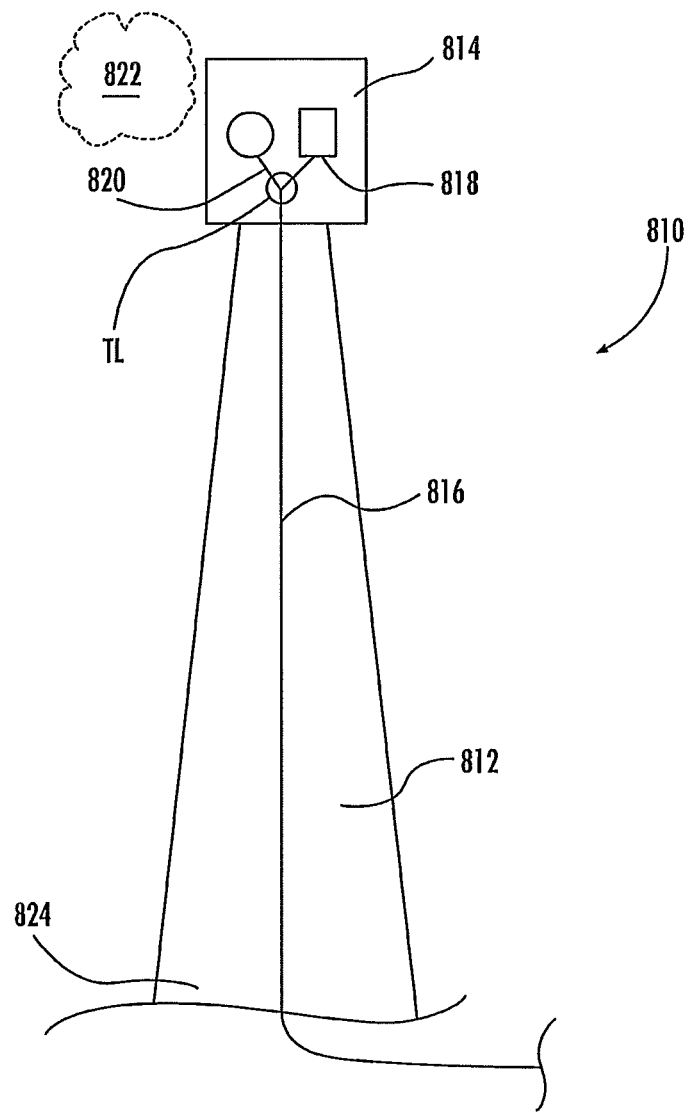
FIG. 10 is a schematic diagram of a power and communication system of an antenna according to an exemplary embodiment.

Referring now to FIG. 10, power and communication system 810 for an antenna 812, includes a transmitter 814, a hybrid cable 816, an electrical-conductor tether 818, and a fiber-optic tether 820. The transmitter 814 is positioned on the antenna 812 for providing an electro-magnetic signal through open space 822, such as air, surrounding the antenna 812. The hybrid cable 816 extends from a base 824 of the antenna 812 to the transmitter 814, and includes both electrical-conductor and fiber-optic elements that are separated from one another at least by insulation or tubing (see, e.g., FIGS. 2-3). For example, the electrical-conductor may be electrically insulated while the fiber-optic elements may extend through a jacket or buffer tube. According to an exemplary embodiment, the electrical-conductor and fiber-optic elements are stranded around a center of the hybrid cable 816, and the electrical-conductor elements include conductors in the range of 10 AWG to 1/0 AWG for providing electrical power to the transmitter 814 and/or other components of the antenna 812. The electrical-conductor tether 818 is coupled to a distal end of the hybrid cable 816 proximate (e.g., in or near) to the transmitter 814, such as within two meters of the transmitter 814. The fiber-optic tether 820 is also coupled to the distal end of the hybrid cable 816 proximate to the transmitter 814. According to an exemplary embodiment, the electrical-conductor tether 818 powers the transmitter 814 and the fiber-optic tether 820 communicates data via the transmitter 814.

In some embodiments, the system 810 includes an overmold surrounding a transition location TL where the tethers 818, 820 are coupled to the hybrid cable 816. As with the overmold of FIG. 1, the overmold mostly consists of polyurethane, thereby providing flexibility; and the overmold is elongate, having a length at least five times the largest cross-sectional dimension of the overmold orthogonal to the length, such that the overmold has a low profile that is configured to pass through narrow ducts of the antenna 10. In some embodiments, an optical fiber of the fiber-optic tether 820 is spliced to an optical fiber of the hybrid cable 816 at a splice point surrounded by the overmold for protection. As with the overmold 110 of FIG. 1, the assembly of FIG. 8 may include a support loop or hook coupled to the hybrid cable 816 and extending from the overmold adjacent to the tethers 818, 820, where the support loop or hook facilitates hoisting of the hybrid cable 816 and assembly from the base 824 of the antenna to the transmitter 814.

In other embodiments, the system of FIG. 10 includes a multi-port coupled to the hybrid cable 816 at the transition location TL, similar to the multi-ports of FIG. 6 or 7. The multi-port, in some such embodiments, includes a single, solid housing and receives the electrical-conductor and fiber-optic elements of the hybrid cable 816. According to an exemplary embodiment, the multi-port includes a first port integrated with the housing that is solely for communicating electrical power via one or more of the electrical-conductor elements, and the multi-port also includes a second port integrated with the housing that is solely for optical communication via one or more of the fiber-optic elements. The first and second ports may be discrete and spaced apart from one another on the multi-port. As shown in FIG. 10, the electrical-conductor tether 818 is connected to the distal end of the hybrid cable 816 via the first port (at the transition location TL) and the fiber-optic tether 820 is connected to the distal end of the hybrid cable 816 via the second port of the multi-port. In some such embodiments, an optical fiber in the tether 820 is spliced to an optical fiber of the hybrid cable 816 and the corresponding splice point is located in the housing of the multi-port.

Figure 11:
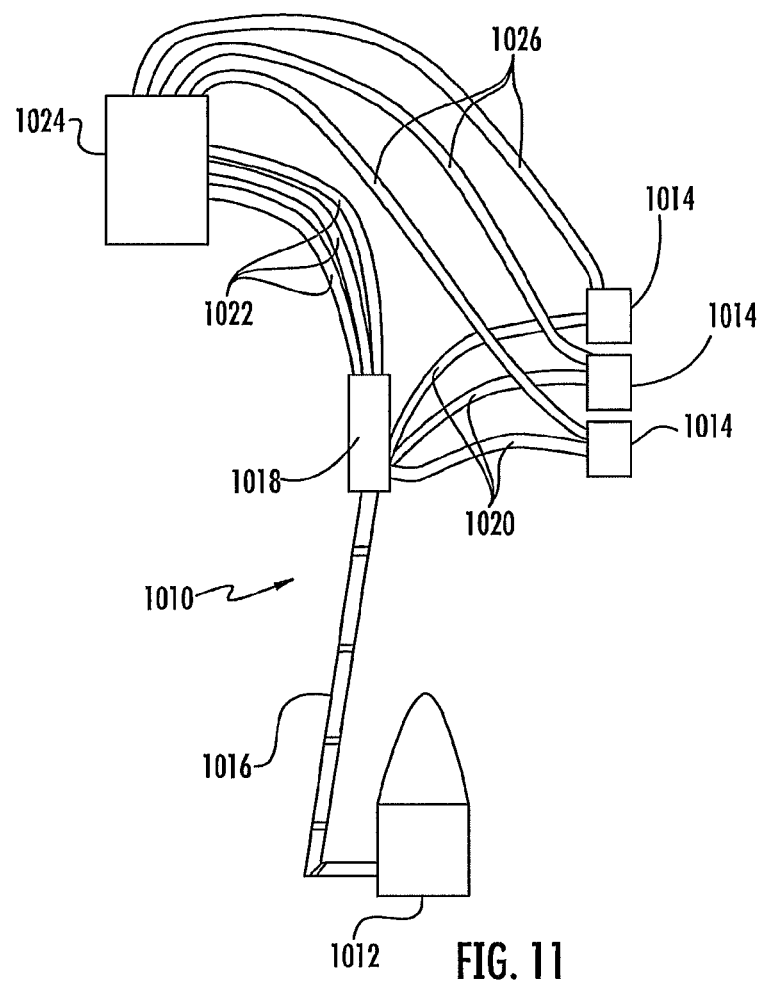
FIG. 11 is a schematic diagram of a power and communication system according to another exemplary embodiment.

Referring to FIG. 11, an antenna 1010 includes a base station 1012 and transmitter (and/or receivers) in the form of remote radio heads 1014. A hybrid cable 1016 extends from the base station 1012 to a low-profile, flexible network access point 1018, as described herein (see assembly 110 as shown in FIG. 1 and assembly 910 as shown in FIG. 12. From the network access point 1018, optical elements from the hybrid cable are communicated through fiber optic tethers 1020 (e.g., tethers, legs, furcated legs) directly to the transmitters 1014, and provide information for transmission thereby. Conductive elements from the hybrid cable 1016 are communicated through conductive tethers 1022 (e.g., electrical tethers, legs) to a terminal 1024, and then routed to the transmitters 1014 via interconnect conductors 1026. Alternatively the conductive tethers 1022 may be routed directly to electrical control modules coupled directly to the transmitters 1014. The network access point 1018 may include fiber optic connectors attached to the fiber optic tethers 1020, such as Opti-Tip™ connectors manufactured by Corning Cable Systems of Hickory, N.C. Alternatively, the connectors could be other types of fiber optic connectors, such as LC, ODC, etc., as shown in FIG. 11.

Referring now to FIG. 12, a low-profile, flexible network access point 910 includes a polyurethane overmolded housing 912 between a hybrid cable 914 and electrical and fiber optic tethers 916, 918 (see also FIGS. 1 and 20A-21). The network access point system 910 includes a loop 920 or hook and may further be coupled to harness, jumper, or other interconnect cables 922 for routing to hardware by way of connectors 924 attached to the tethers 916, 918.

Referring to FIGS. 13A-19, a plug 1112 (e.g., end cap) may be attached to the distal end of the hybrid cable 1114, proximate to the location at which the tethers 1116, 1118 connect to the optical and electrical elements of the hybrid cable 1114 in a cable assembly 1110. The plug 1112 may be conductive, or may include conductive pathways integrated therewith. According to an exemplary embodiment, the plug 1112 provides a conductive path from shielding 1120 in the electrical tethers to armor 1122 of the hybrid cable 1114. In addition, the plug 1112 seals the end of the hybrid cable 1114 so that overmold material 1124 (FIG. 13E) does not pass into the hybrid cable 1114 during manufacturing of the flexible housing (e.g., housing 912 as shown in FIG. 12). In some embodiments, openings 1128, 1130 are formed in the plug 1112 through which the conductive and fiber-optic elements may pass through the plug 1112. According to an exemplary embodiment, the plug 1112 includes a first portion 1132 that contacts the inside of the armor 1122, and a second portion 1134 that overlays the outer diameter of the hybrid cable 1114, thereby both gripping and electrically connecting the plug 1112 and armor 1122.

FIGS. 13A-13E show steps for assembling the flexible network access point 1110 according to an exemplary embodiment. The steps include splicing or joining the conductive and optical elements to respective elements of the tethers 1116, 1118, such that the joined elements extend through the plug 1112. In some embodiments, a strength member 1136 of the hybrid cable 1114 also extends through the plug 1112, to be coupled to a loop 11138. Conductive elements of the plug 1112 contact the armor 1122 of the hybrid cable 1114 to provide a grounding path from the tether 1116, through the network access point 1110, and to the armor 1122 of the hybrid cable 1114. As shown in FIGS. 13A-17A, the plug 1112 may be attached to the hybrid cable 1114 via various fastening options, including set screws 1210 (FIG. 14), spring fingers 1310 (FIG. 15), compressive loading and deformation 1410 (FIG. 16), flaring 1510 (FIG. 17), adhesives, friction fit, threaded coupling, welding, and other fastening options that facilitate both physical and electrical coupling of the plug 1112 to the hybrid cable 1114.

Referring to FIG. 18, the electrical wire of the tether 1116 (top) is joined to the conductive element 1116' of the hybrid cable 1114 via a wire crimp 1140 positioned between the plug 1112 and the interior of the hybrid cable 1114, while the optical element 1118' is spliced to the tether 1118 outside of the plug 1112, but within the overmolded housing 1124. Further, the splice 1142 is protected within a tube 1144 that is sealed to the fiber optic tether 1118 and optical elements 1118'. In an alternative embodiment, the plug 1112' includes an extended enclosure (i.e., longer in length) within the plug 1112', which may support the conductor junction 1140 and/or optical splice 1142. Also shown in FIGS. 13A-16 and 18-19, a portion of sheathing of the conductive element 1116 is removed to expose radio-frequency shielding 1120 of the conductive element 1116. This shielding 1120 contacts a conductive pathway through the plug 1112 that is electrically connected to the armor 1122 of the hybrid cable 1114, and serves for grounding the conductive element 1116.

FIGS. 20A and 21 show alternative systems 1610 for grounding the conductive elements 1612 of the system, which include grounding wires 1614 that connect shielding of the tethers 1616 (e.g. the tethers 1616 each including two conductive wires surrounded by radio-frequency shielding and within a polymeric jacket). The grounding wires 1614 are coupled to the armor 1620 of the hybrid cable 1618 via a "gator" clip 1622 or another electrically conductive attachment device. As shown in FIG. 20B, the loop 1624 (e.g., pulling eye) may be attached to a grip 1626 that holds to the outside of the hybrid cable 1618, instead of the strength member 1628 as shown in FIGS. 20A and 21. In FIG. 21, a radio-frequency shield sock 1630 overlays the junction 1632 between the conductive wires 1612 of the hybrid cable 1618 and the electrical tether(s) 1616. The sock 1630 is then electrically coupled to the armor 1620 of the hybrid cable 1618.

FIGS. 22A and 22B show "figure-8" style hybrid cables 1710, 1810 where the optical and electrical elements 1712, 1812, 1714, 1814 of the hybrid cables 1710, 1810 are within separate jacket sections 1716, 1718, 1816, 1818 that are joined by a web or webbing 1720, 1820. As shown in FIG. 22C, the splice 1722 between the hybrid cable 1710 and fiber optic tethers 1724 may be separately overmolded 1726, 1728 and housed from the junction 1730 between the hybrid cable 1710 and electrical tethers 1732. Such a configuration may provide even greater flexibility and maneuverability of the network access point(s).

FIG. 23A shows a conductive tether 1910 with radio-frequency shielding 1912, and a ground/shield wire 1914 extending from the shielding 1912, to be electrically coupled to the armor 1918 (FIG. 23B) of the hybrid cable 1916. Conductive wires 1920 extending from the tether 1910 are joined to conductive wires 1922 from the hybrid cable 1916. As shown in FIG. 23B, the hybrid cable 1916 (e.g., vertical cable, distribution cable, main cable) includes a polymeric jacket 1924 overlaying an armor shield 1918, which may function both for grounding and crush/impact shielding of the cable 1916. According to an exemplary embodiment, the armor 1918 folds up around and encloses crimp bands 1926 joining the conductors of the hybrid cable and tether 1920, 1922. As shown in FIG. 23C, the crimp bands 1926 are then surrounded by a mesh 1928 or other radio-frequency shielding that is attached to the tether jacket 1930, such as by a heat shrink tube 1932 or other attachment element (e.g., glue, UV resistance tube). Ground wires 1914 connect the mesh 1928 to the armor 1918 of the hybrid cable 1916.

Figure 24:
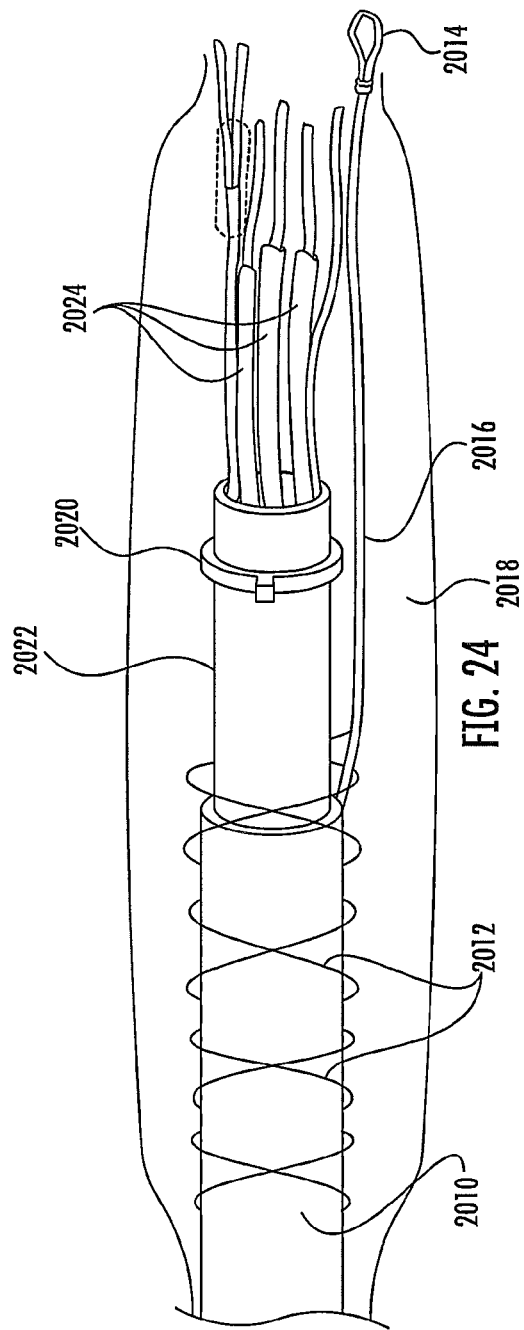

Referring to FIG. 24, a grip 2012 may be attached to the exterior of the hybrid cable 2010 and connected to a lifting loop 2014 (see also FIG. 20B) via a line 2016 that passes within or underneath the overmold housing 2018. A crimp band 2020 or heat shrink may be used to secure a conductive sleeve 2022 or wires to exposed shielding of tether cables 2024, and thereby provide a conductive path through the network access point.

Figure 25B:
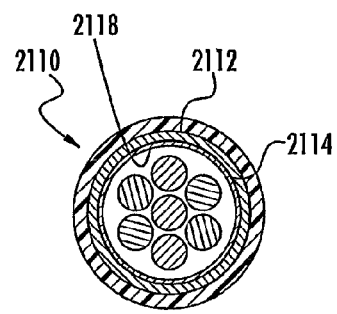
Figure 25A:
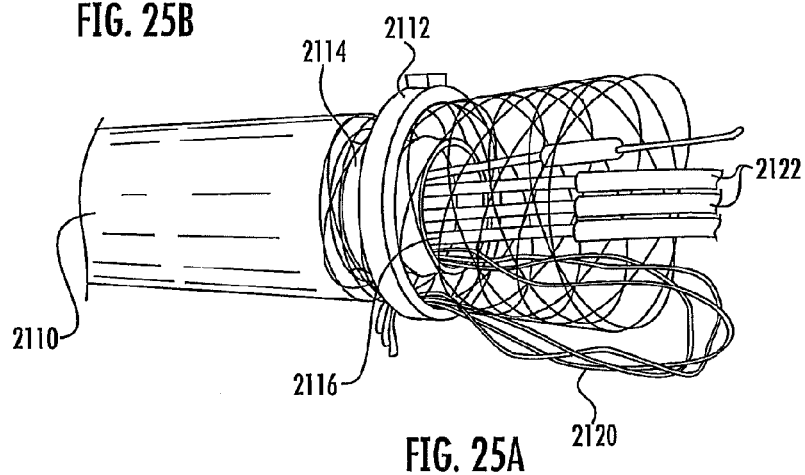

Referring now to FIGS. 25A-B, the hybrid cable 2110 includes a reinforcement band 2118 positioned on the inside of the end of the cable 2110, beneath the armor 2114. A mesh 2116 or other shielding is positioned around the end of the cable 2110, contacting the armor 2114 of the hybrid cable 21100. A crimp band 2112 is positioned around the shielding 2116 and is tightened around the shielding 2116 to hold the shielding 2116 to the armor 2114, between the crimp band 2112 (on the outside) and the reinforcement band 2118 (on the inside). Grounding conductive wires 2120 connect the shielding of conductive tethers 2122 (e.g., braided layer below the jacket but surround the main conductors and separated therefrom via a dielectric layer) with the armor 2114.

EXAMPLE

The following are example systems that may be representative of disclosure provided.

The consumers' demand for mobile video and web access generates data traffic levels that may congest global cellular networks. Some mobile operators and equipment vendors are moving through 3G and on to 4G/LTE technologies, and using fiber to the antenna (FTTA) to deliver the capabilities consumers demand. Unlike traditional co-axial solutions, hybrid FTTA delivers both optical fiber and power to the antenna. Power/fiber connectivity systems have been evolving to better match the application space. The above-disclosed low-profile innovations offer more cost effective, space-efficient embodiments for the increasingly-crowded antenna environment.

Figure 26:
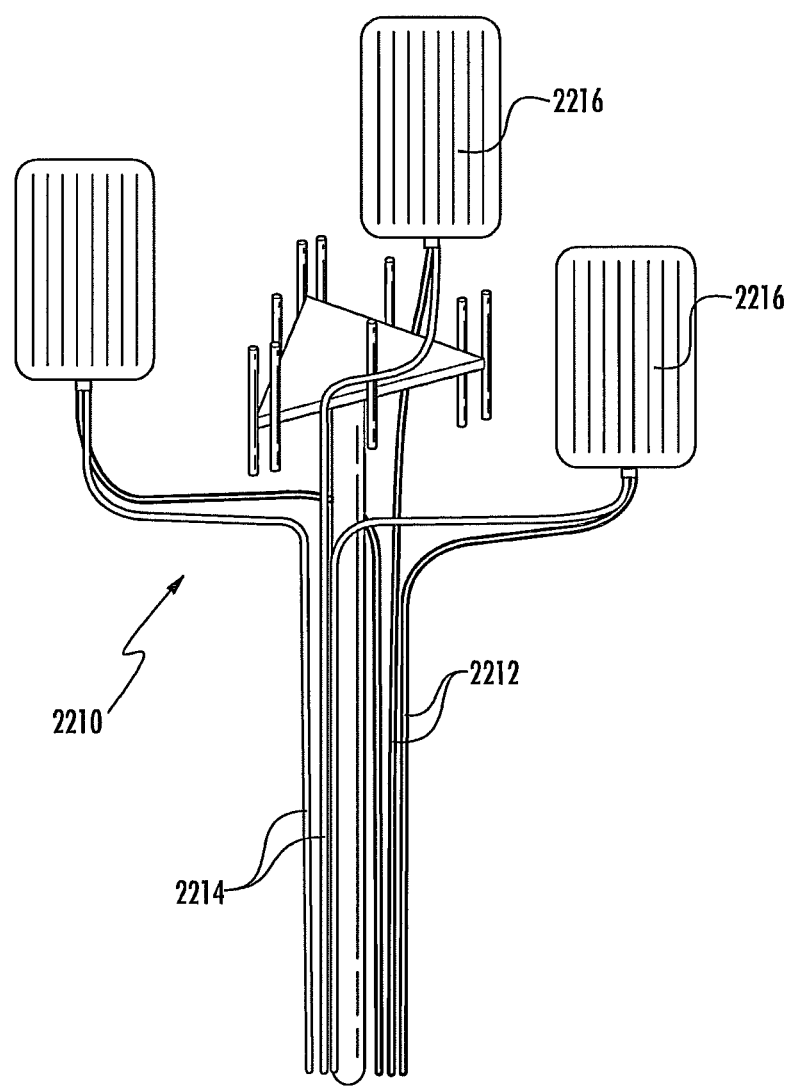
FIGS. 26-28 are perspective views of terminal solution for FTTA deployments.
Figure 27:
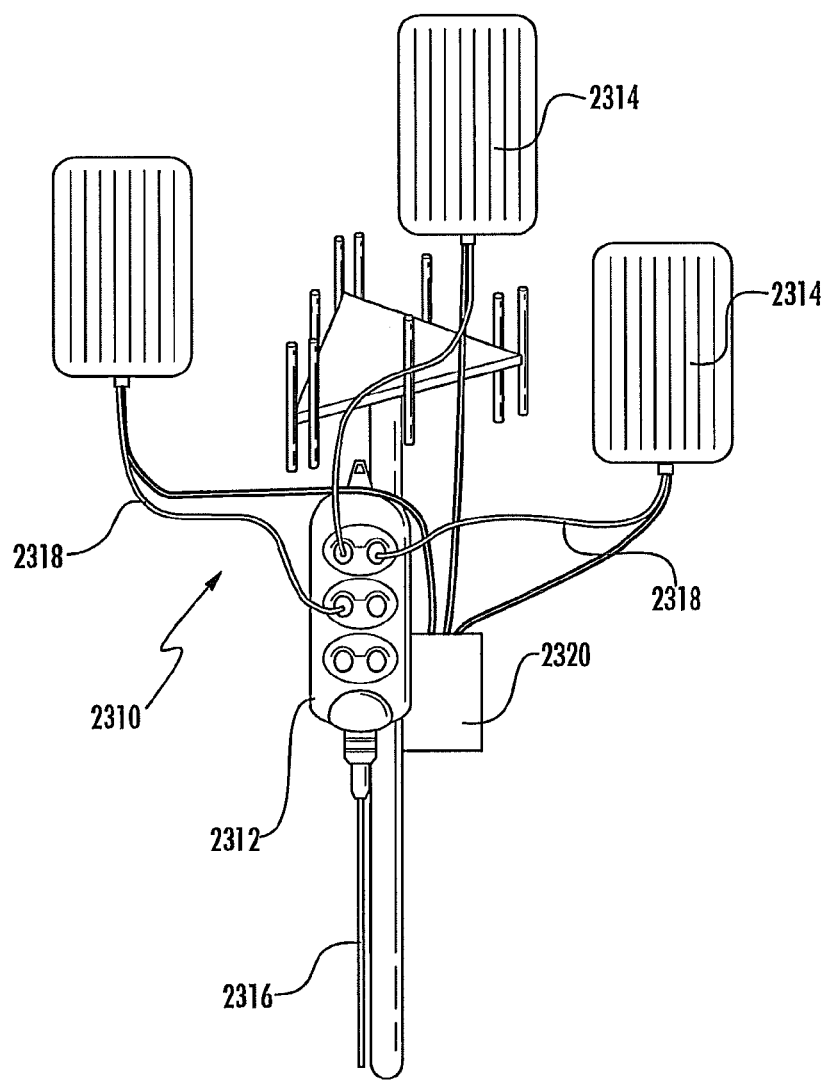
Figure 28:
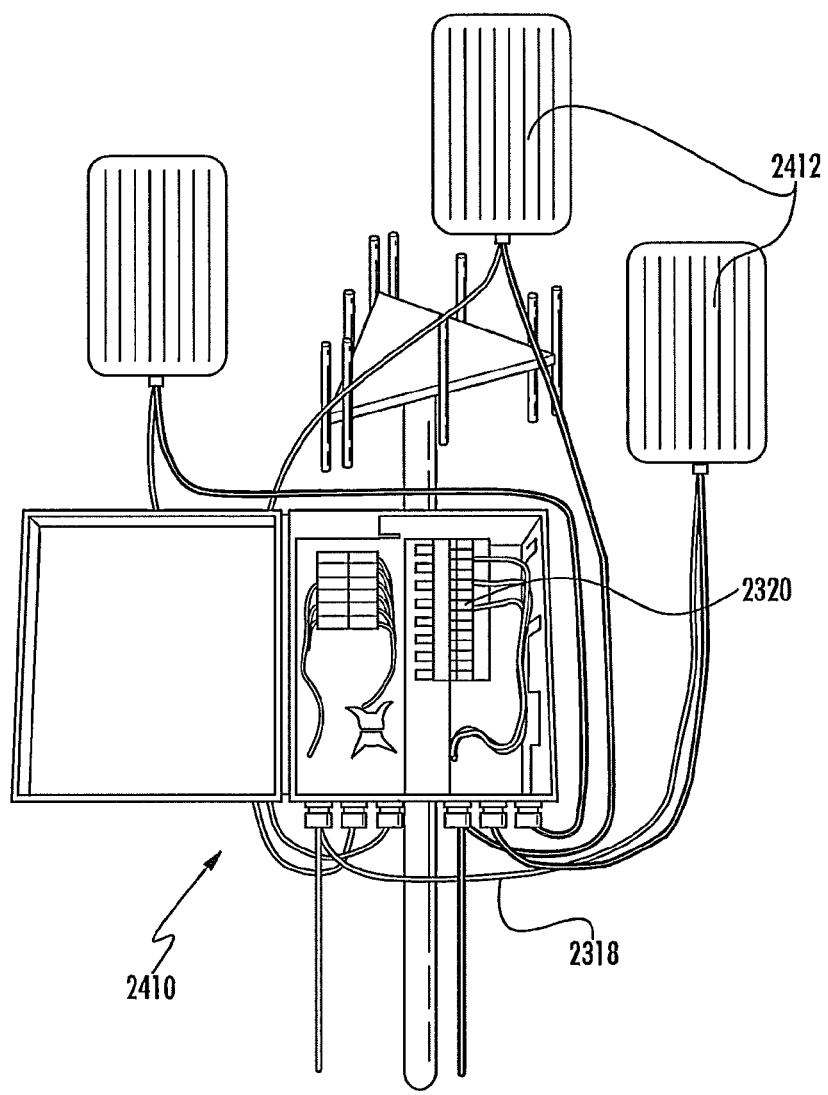

As more fully explained below, challenges addressed or overcome by embodiments in the disclosure above include: (1) congestion where RRH equipment competes for space with older equipment that continues in operation; (2) deployment sites vary extensively, driving multiple product solution sets; (3) deployment sites are frequently in harsh environments with wind, vibration, and temperature extremes; (4) deployment speeds are critical—the faster new technologies or architectures can be deployed, the sooner revenue or savings can be recognized in financial returns; and (5) total cost of ownership must account for installation time, support hardware, adds/changes and operational expense (lease and maintenance) impacts FIGS. 26-28 provide context with regard to FTTA solutions. The system of the present Example, shown in FIG. 29, differs from the systems 2210, 2310, 2410, 2510 shown in FIGS. 26-28. However, the systems 2210, 2310, 2410, 2510 of FIGS. 26-28, or features or arrangements thereof, may be or be included in other embodiments, as disclosed above. For example, features of the system 2310 of FIG. 27 may be integrated with or combined with features of the system 510 shown in FIGS. 6-7.

Referring to FIG. 26, one solution is the "homerun" 2210, which uses separate power 2212 and fiber cables 2214 to connect each RRH 2216 individually. While this solution 2210 offers a low initial material cost, its multiple cable runs and connections can be labor intensive and offset material savings. Preconnectorized cables are favored over field-terminated cables for their ruggedness, low attenuation and straight-out-of-the-box placement. Dedicated optical and power cables to each RRH 2216 add to site congestion and management on severely limited real estate. The homerun approach 2210 is challenged to support equipment adds, changes and expansion; repair dictates full-length replacements.

Referring to FIG. 27, another solution is the "terminal" solution 2310. Terminals 2312, such as those 510 shown in FIGS. 6-7 and FIG. 27 may provide an easy aggregation and management point, supporting many radios 2314 from a common connection point and one vertical cable 2316 at the site. Optical and power may be supplied from separate or combined (hybrid) terminals 510, 2312. The many cables of the homerun solution 2210 are replaced by just one or two vertical cables 2316 for many RRHs 2314. Because the terminal 510, 2312 is an interconnect, it provides built-in sparing capability and flexibility to easily change/replace radio jumpers 2318. Additionally, over-voltage, or surge protection can be provided inside the terminal 2320 to protect the RRH electronics. Terminal solutions have an upfront bump in material cost over homerun solutions 2210, but they bring the advantages of organization, surge protection, labor savings, and reduced attachment hardware. Terminals 2320 come in a range of sizes, depending on capabilities, and may add slightly to bulk-, weight-, and wind-load on towers. These costs may be offset by reducing the number of cables and resultant wind-load and space requirements.

Generally referring now to FIG. 28, hybrid cables, which combine optical fiber and power conductors in a single sheath (see also FIGS. 2-3) further minimize the cable count, wind-load, space, installation time, and operational expense/lease impacts. A single cable with power and fiber conductors is typically less expensive than multiple cables when material and installation are considered together, as discussed above. Placing a single cable from the BTS (e.g., base; see base 1012 as shown in FIG. 11) to the RRH 2412 may be faster and require less attachment hardware than multiple cables. The further reduction in the number of cables brings space and load advantages as well. Where operators pay leasing to tower/building owners by the cable, hybrid cables offer greater long-term operational expense advantages, when compared to using multiple, separate cables.

Each of the solutions 2210, 2310, 2410 shown in FIGS. 26-28 is viable depending on the variables. Choosing from among the different solutions available requires analysis of the technology requirements, the space constraints, deployment timelines and budget. An ideal solution would overcome each of the above-listed challenges, with the least amount of drawbacks. In some embodiments, as disclosed above, systems may meet these challenges, leveraging the functionality of a terminal solution, but eliminating the associated rigid box or shell 2320. In some such embodiments, "low-profile" solutions 110, 910, 2510 connect multiple RRHs 2512 and consume none of the valuable real estate (i.e., space) that terminals 2320 and multiple cables 2212, 2214 use (see FIGS. 1, 12, and 29). Such low-profile solutions 110, 910, 2510 may combine ruggedness with dense and super-fast, easy connectivity. Their simplicity approaches that of the homerun system 2210 (FIG. 26), but they retain many of the benefits and versatility found in terminals 2320 (FIG. 27).

According to an exemplary embodiment, the "low-profile" solution 110, 910, 2510 (see FIGS. 1, 12, and 29) can be configured in various layouts, but a brief description of an Example configuration is now described.

Figure 29:
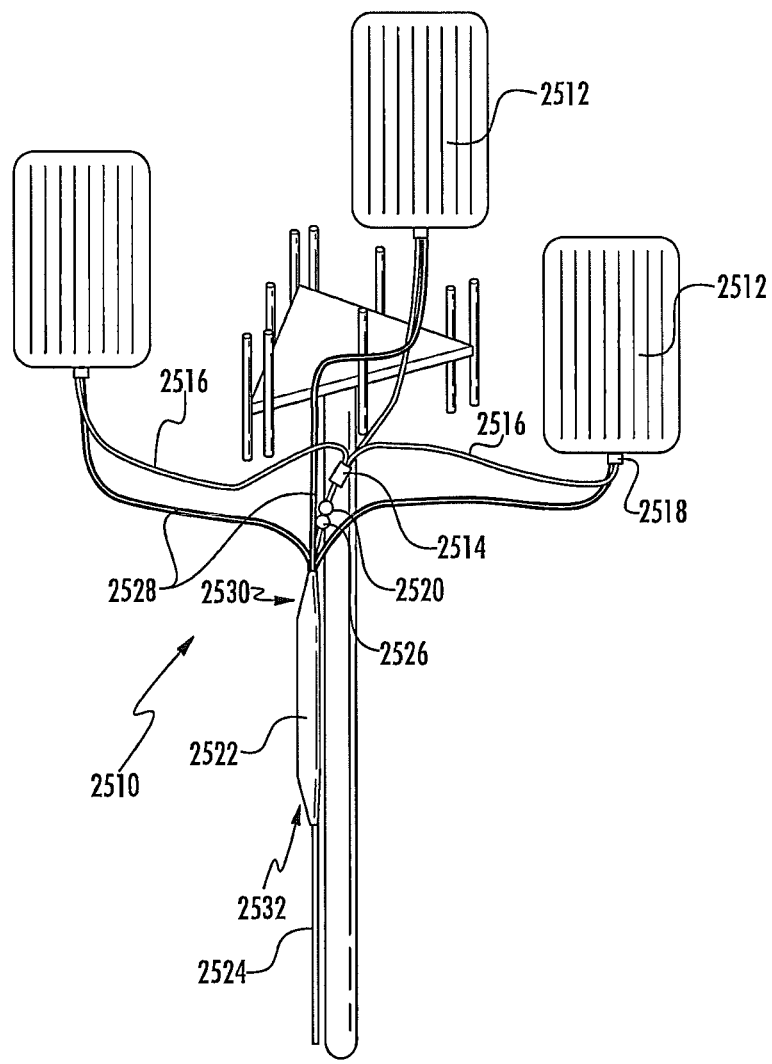
FIG. 29 is a perspective view of a low-profile hybrid terminal solution for FTTA deployments according to an exemplary embodiment.

Starting at the remote radio head (RRH) 2512, the "low-profile" solution 2510 of FIG. 29 uses a fiber harness 2514 to connect three RRHs 2510 (see also interconnect cables 922 as shown in FIG. 12). A short six-fiber cable breaks out into three longer legs 2516 with two-fiber RRH connectors 2518 at the end. At the other end of the harness 2514, a six-fiber connector 2520 plugs into a factory-terminated vertical cable assembly 2522. Using a multi-fiber optical connector 2520 between the vertical cable assembly 2522 and RRH harness 2514 addresses a concern of wireless operators: what if something needs to be replaced or the RRHs 2512 (and connectors) change? In this Example, as shown in FIG. 29, only the fiber harness 2514 needs to be replaced; the vertical cable assembly 2522 is untouched.

In various alternate exemplary embodiments, the low-profile solution 2510 may be configured as a fiber-only (and companion power-only) harness, or combined into a single hybrid (fiber/power) solution, as shown in FIG. 29. Higher conductor and fiber counts are also contemplated, where more RRHs 2512 must be supported. In the present Example, the vertical cable assembly 2522 includes a hybrid cable 2524 (see also cables 212, 312 FIGS. 2-3) with six optical fibers and three copper power conductors. The "top side" 2530 of the vertical assembly 2522 contains a single 6-fiber optical connector 2526, and three shielded RRH power tethers 2528. This breakout end of the assembly 2522 provides the same function as a breakout box 2320 for power (see power management as shown in FIG. 27). The base transceiver station (BTS) end 2532 of the vertical assembly 2522 has three copper conductor pairs (to be dressed to length) and six LC duplex connectors. If required, over-voltage protection may be added either at the RRH end 2530 or the BTS end 2532 of the vertical assembly 2522. If the copper conductor length needs to be adjusted, the sheath of the hybrid cable 2524 can be easily removed for access.

According to an exemplary embodiment, the "low-profile" harness 2514 and vertical assembly 2522 address the challenges of FTTA deployment. More specifically, regarding space, the harness 2514 and vertical assembly 2522 require minimal space and less attachment hardware in congested environments. Regarding site variability, the harness 2514 lengths can be built to suit different length requirements of the various types of FTTA site, and the Example system is compatible with a wide range of RRH electronics. Regarding reliability, the factory-terminated assemblies utilize ruggedized outdoor hardened connectors 2518, 2520, 2526. Regarding speed, the pre-terminated assemblies 2515, 2522 are a simple 'plug-and-play' for installers. A single cable pull connects three or more RRH units 2512. No field terminations, terminal mounts or connections may be required. This feature, as included in the present Example embodiment, also enables quick recovery in the event of a break at the RRH end of a connection. Regarding adds/upgrades (e.g., the addition of new or different equipment connected to the system), the vertical harness 2514 can include additional fibers and power conductors to allow for quick addition of new RRH units.

A summarizing comparison of how each of the different types of FTTA architectures 2210, 2310, 2410, 2510 shown in FIGS. 26-29 functions with respect to the challenges identified in the present Example is outlined below in Table 1.

While each solution 2210, 2310, 2410, 2510 has benefits, the "low-profile" solution 110, 910, 2510 of the present Example overcomes all of the challenges.

TABLE 1

| | Cost (materials) | Total Cost | Speed (of Install) | Flexibility | Space | Reliability |
|---|---|---|---|---|---|---|
| Home Run | $ | $$ | | | | ✓ |
| Terminals | $$ | $$$$ | | ✓ | | ✓ |
| Hybrid Terminal | $$$ | $$$ | ✓ | ✓ | | ✓ |
| Low Profile | $$ | $$ | ✓ | ✓ | ✓ | ✓ |

Referring now to FIGS. 30-34, a cable assembly 2610, similar to those disclosed above, includes a cable 2612 coupled to tethers 2614, 2616 (e.g., fiber optic tethers 2614, power tethers 2616 or leads). In some embodiments, the cable 2612 is a hybrid cable, including both electrical conductor elements (e.g., electrical wires) and fiber optic elements (e.g., polymeric tubes containing optical fibers). As discussed above, the cable 2612 may be configured to supply power to an antenna as well as carry optical fibers for high-speed data transmission, however the technology disclosed herein may be used in other applications. In contemplated embodiments, the cable assembly 2610 or other cable assemblies disclosed herein, includes only electrical conductor elements and the tethers are all power tethers 2616 or electrical tethers, such as those that include a copper conductor for communication of electrical signals or power.

According to an exemplary embodiment, the cable 2612 includes an access point having one cable opening (approximately 18-inches or less in length; e.g., about 12-inches) to access the fibers for future splicing. The opening may be outfitted with components used in a network assess point. A pulling mechanism 2618 (FIG. 34) is attached to a strength member of the cable 2612 (e.g., central strength member) or other elements capable of sustaining pulling, lifting, and/or supporting loads at a location that allows a pulling eye of the grip to extend out the end of the over-molded closure 2620 (FIG. 34) with the fiber tether(s) 2614 and power tethers 2616.

According to an exemplary embodiment, the cable 2612 includes a ground path that is configured to communicate electricity to the ground for dissipation, as necessary. In some embodiments, the ground path is in the form of protective armor 2622 or shielding for the cable 2612, providing crush and impact protection to the cable 2612, as well as providing strength to the cable 2612. The ground path may be integrated with the armor 2622, such as with embedded or coupled wiring, or may be the armor itself, such as with copper or aluminum armoring. In some embodiments, the power tethers 2616 likewise include a ground path integrated therewith, such as a metal mesh 2624 surrounding a core of the power tether 2616.

According to an exemplary embodiment, the ground path of each tether 2616 should be coupled to the ground path of the cable 2612 in order to provide a continuous path for grounding throughout the cable assembly 2610. However, the ground paths of the power tethers 2616 may be of a different size, material, spaced apart from, and/or otherwise incompatible with the ground path of the cable 2612, making the task of electrical coupling therebetween cumbersome. Additional wires may be attached to both the tethers 2616 and the cable 2612 ground paths to provide the coupling; however, such wires would take space and add complexity to the assembly 2610, potentially increasing the difficulty to achieve the flexible, low-profile assembly structures described herein.

Figure 30:
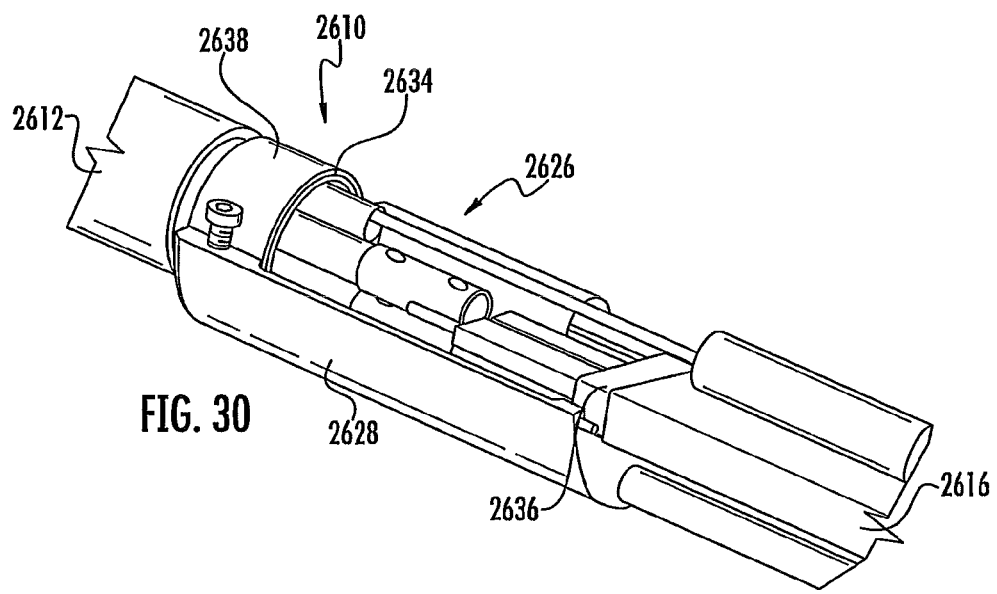
FIG. 30 is a perspective view of a chamber of a cable assembly within which tethers are coupled to elements of a cable according to an exemplary embodiment.
Figure 31:
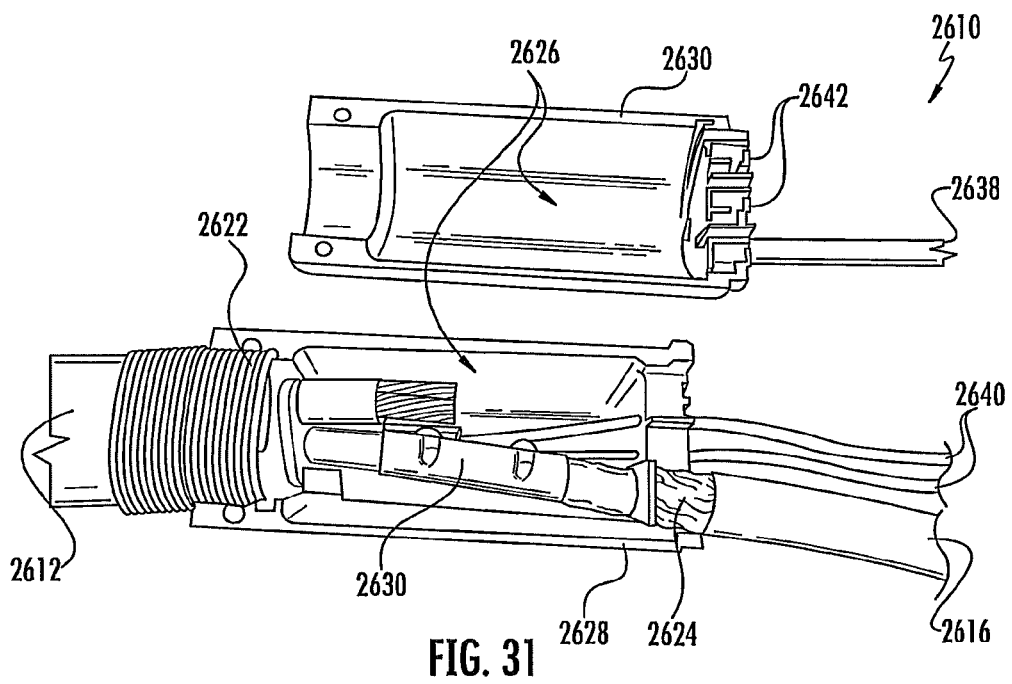
FIG. 31 is a digital image of the chamber of FIG. 30.

Referring specifically to FIGS. 30-31, the cable assembly 2610 includes a chamber 2626 (e.g., joining assembly). While shown in FIGS. 30-31 as a clam shell assembly, the chamber 2626 may include additional sides (e.g., three-piece assembly) or the components may attach to one another in other ways, such as the plug or capped embodiments shown in FIGS. 13-19. According to an exemplary embodiment, the chamber 2626 simultaneously serves at least four functions for the cable assembly: (1) secures splicing area to protect a furcation and/or splice location for elements of the cable 2612, (2) structurally supports (e.g., load coupling) attachment of the tethers 2616 to the cable 2612, (3) provides an easy and efficient ground path between ground paths of the power tethers 2616 and the cable 2612, and (4) maintains shielding across the power splicing area.

The cable assembly 2610 of FIGS. 30-31, includes a cable 2612 (left) connecting to a chamber 2626, which is formed from a clam shell type arrangement, where two half-cylinders 2628, 2630 may be fastened together to form the chamber 2626. Extending from the chamber 2626, on the end opposite to the cable 2612, are tethers 2616, 2614 or legs, in the form of power tethers 2616 carrying electrical conductors and fiber optic tethers 2614 carrying optical fibers. Within the chamber 2626, the power tethers are spliced to electrical conductor elements of the cable 2612. As shown in FIGS. 30-31, a butt splice 2632 may be used, but other splicing arrangements are contemplated. The spliced connections are then insulated with a heat shrink, dielectric tube, epoxy shell, or other insulator; or are not insulated.

According to an exemplary embodiment, rings 2634, 2636 (FIG. 30) or other rigid structures (e.g., brackets, L-beams) are positioned within the cover of the cable 2612 (e.g., "cable jacket") and power tethers 2616 such that the rings 2634, 2636 are underneath shielding 2622, 2624 (e.g., copper armor) of the cable 2612 and power tethers 2616. As shown in FIG. 30, ring 2634 for the cable 2612 is round but the rings 2636 for the power tethers 2616 are rectangular loops. The rings 2634, 2636 reinforce the shielding, allowing the clam shell 2628, 2630 to be tightly fastened over the shielding 2622, 2624, clamping the shielding 2622, 2624 between the rings 2634, 2636 and the clam shell 2628, 2630. Each power tether 2616 may have its own slot at corresponding compression surfaces for coupling the shielding 2622, 2624 of the connector to the clam shell 2628, 2630 ground path.

Other elements of the cable assembly 2610, such as a ground wire 2638 for the clam shell 2628, 2630, alarm wires 2640 (lower-power capacity tethers), and/or fiber optic tethers 2614 may extend through apertures 2642 in the clam shell walls 2628, 2630. For example, the ground wire 2638 in FIG. 30 is bolted to the clam shell 2628, 2630. Fastener holes, a shell latch, and/or other fasteners may be used to close and/or tighten the halves 2628, 2630 of the clam shell together.

According to an exemplary embodiment, the chamber 2626 contains power conductor splices 2630 which are then insulated with heat shrinks and potted with an epoxy filler, thus tying the armor 2622 and all conductor elements together as one, mechanically. According to an exemplary embodiment, load coupling is at least partially achieved via the chamber 2626 being formed as a clam-shell device that clamps to the armor 2622 of the cable 2612 and to the power tether shield 2624/grounding conductors. Furthermore, in some embodiments, a rod (e.g., a threaded rod) is run parallel to the cable inside the over-mold 2620 and fastens to the clam-shell device 2628, 2630. This rod/assembly arrangement transfers lift/support loading from a loop 2618 outside of the over-mold 2620 ("up" side) to the clam shell 2628, 2630, which then transfers load into strong elements of the hybrid cable 2612. The rod/assembly can sustain at least 700 lb in loading.

According to an exemplary embodiment, the chamber 2626 serves as an electrical joining point. In some embodiments, the clam shell 2628, 2630 serves to electrically join conductor elements of the cable 2612 with power tethers 2616 that extend from the over-mold 2620, which may be routed to individual radios or other components. In some embodiments, the conductors are spliced to the cable 2612, such as mechanically using a "butt splice" or end-to-end splice. Heat shrinks may be used to provide electrical insulation for each splice 2630. Once spliced and electrically insulated, the splices 2630 then are positioned next to each other within the chamber 2626 and open space within the chamber is potted (i.e., filled) with epoxy or another filler, which holds the elements in securely in place and provides additional reinforcement and insulation.

According to an exemplary embodiment, the chamber 2626 serves to maintain shielding 2622, 2624 across the power splicing area. Maintaining electrical shielding 2622, 2624 and bonding the cable armor 2622 to shielding 2624 on individual power tethers 2616 may greatly benefit the performance of the cable assembly 2610 with regard to mitigating or controlling electromagnetic interference, which may be particularly relevant to fiber-to-the-antenna applications, where electromagnetic interference may attenuate or otherwise interfere with radio transmissions.

In some embodiments, important to shielding 2622, 2624 and bonding is getting a good electrical connection between the cable armor 2622 and the power tether shields 2624, which may be achieved by sliding a support ring/band 2634, 2636 or other rigid element under the armor/shielding 2622, 2624; then, when the clam shell 2628, 2630 is closed, the clam shell 2628, 2630 compresses the armor/shielding 2622, 2624 down against the conductive path of the clam shell 2628, 2630, providing consistent and sufficient clamping force without causing excessive pressure on the cable core elements. The inner band/ring 2634, 2636 (or other rigid element) and clam shell 2628, 2630 combination contacts the armor all around the circumference of the cable 2612, 2616 for a large contact area. In contemplated embodiments, this approach may also be used as a field-installable grounding kits and methods.

Alternate embodiments include clamping a band only from the outside, which may compress the cable core and be less consistent/repeatable; or using a grounding clamp, common to the fiber optic industry, for armored cables, but the grounding clamp shape may not be well suited to applying a shield over the power splice area and grounding clamp may not contact as much armor 2622, 2624 surface area for electrical bonding when compared to the clam shell 2628, 2630 approach, as shown in FIGS. 30-31 for example.

According to an exemplary embodiment, optical fiber 2614 and alarm wires 2640 are also housed in the chamber 2626. In some embodiments, the clam shell 2628, 2630 passes fiber optic subunit(s) 2614 and alarm wires 2640 in the hybrid cable 2612 through the power splice 2630/potted area for handling outside the shell 2628, 2630. The optical fibers may be spliced separately.

The use of flexible style breakouts (e.g., assembly 110, 910, 1110, 2510, 2610) has several advantages for use in monopole and tower applications. In monopole applications the interior space is often congested with existing cables and structural components. The long slender breakout design, as disclosed herein, minimizes size allowing the assembly 110, 910, 1110, 2510, 2610 to fit in very confined places. The flexible design enables the assembly 110, 910, 1110, 2510, 2610 to wind its way through the congested space.

Figure 32:
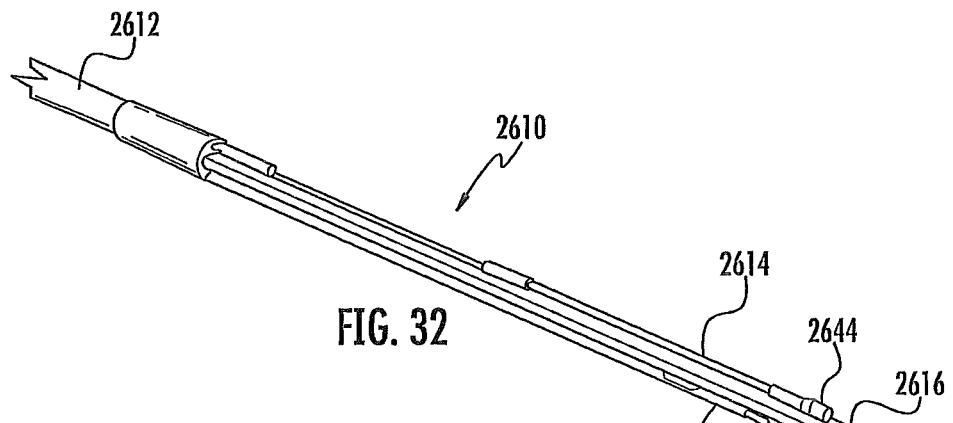
FIG. 32 is a perspective view of tethers extending from the chamber of the cable assembly of FIG. 30.
Figure 33:
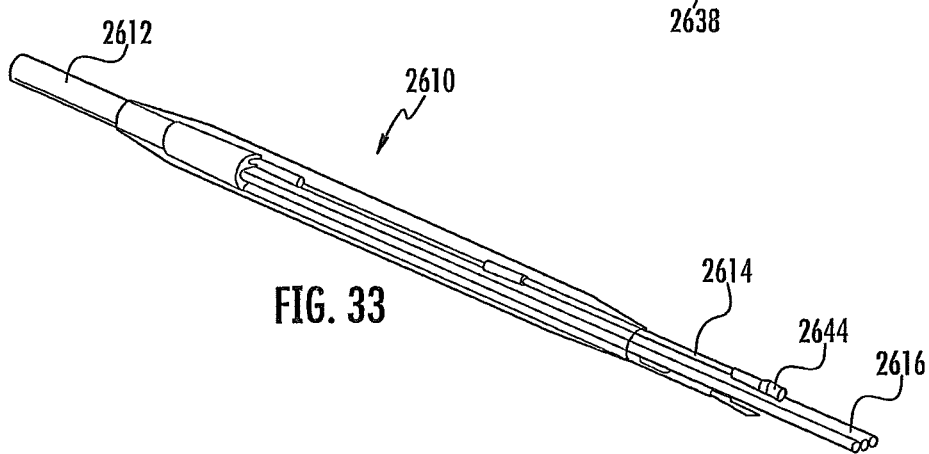
FIG. 33 is a perspective view the cable assembly of FIG. 30 with the chamber overmolded according to an exemplary embodiment.
Figure 34:
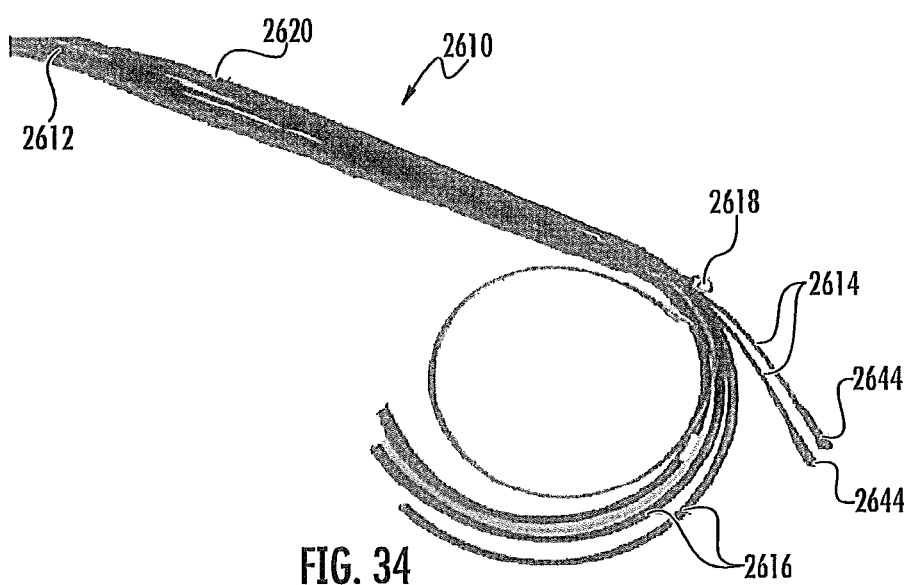
FIG. 34 is a digital image of the cable assembly of 33, including two optical fiber tethers with connectors, three power tethers, and a ground wire.

FIGS. 32-34 show the clam shell chamber 2626 integrated with the overall cable assembly 2610. As shown, the cable assembly 2610 may have a particularly long and narrow profile for a hybrid assembly, which may be beneficial for passage through narrow ducts and openings in an antenna. Further, as shown in FIGS. 33-34, the chamber 2626 and corresponding splice area may be encased in a flexible overmold 2620 material, as further described above with regard to other embodiments disclosed herein. As such, the embodiments of FIGS. 32-34, including the clam shell chamber 2626, may be used in conjunction with the low-profile, flexible overmold 2620.

As shown in FIG. 34, the breakout 2610 can also include an integrated pulling loop 2618 or device (see eyelet on right end of overmolded area). The integrated pulling loop 2618 may speed up deployment of the cable assembly 2610. With the pulling loop 2618 being factory installed, the pull strength may be more reliable. The integrated pulling loop 2618 can also be used as device for permanently fixing the cable assembly 2610 to the antenna tower or other structure. Load coupling of the cable 2612 and the tethers 2616, 2614 with the pulling loop 2618 and chamber 2626 in the cable assembly 2610, provides a consistent method to lift and support the cable 2612, both during installation and once placed. Conventional hybrid cables may not have a separate strength member, and instead use the conductors as the strength elements, which load-bearing capacity limited to the inherent strength of the conductors (sized for current capacity as opposed to load). The clam shell 2628, 2630, or other chamber designs disclosed herein, provides a compact solution to couple load to conductor and fiber optic elements.

According to an exemplary embodiment, the flexible-style overmolded cable assembly 110, 910, 1110, 2510, 2610 has a weather-resistant capability, where the overmold 2620 is impenetrable to water and prevents the ingress of dust or other contaminants into the cable 212, 312, 2612 and cable assembly 110, 910, 1110, 2510, 2610. In some embodiments, with use of high-fiber-count optical connectors 2644 (e.g., six, eight, twelve, twenty-four fiber connectors) the cable assembly 2610 may have a single "tether" 2614 carrying the corresponding optical fibers. For example, a six fiber connector can be mated to a harness cable assembly (see 922 in FIG. 12) that then breaks out to three radio heads, which may reduce costs by having a single connection point on the vertical assembly. Such a system may also reduce the amount of time and effort needed to make connections at the top of the tower.

According to an exemplary embodiment, incorporation of conductors and optical fiber into a single cable assembly 110, 910, 1110, 2510, 2610, may reduce lease costs by having a single cable running up the tower. Additionally, use of hardened fiber-optic connectors 2644 attached to the fiber optic tethers 2614 and harness assembly 922 (FIG. 12) may remove a need for a standard style closure. The low profile cable assembly 110, 910, 1110, 2510, 2610 design, "a bulge in the cable", may further reduce lease costs because the assembly 110, 910, 1110, 2510, 2610 may not be viewed as a "closure" in some lease agreements. Further, the assembly 110, 910, 1110, 2510, 2610 requires a relatively small amount of mounting space in already crowded environments.

According to an exemplary embodiment, the cable assembly 2610, as shown in FIGS. 30-34, includes a shield-maintaining feature 2622, 2624, which prevents exposure of electrical elements to electromagnetic interference that could be transferred along conductors into the radio, as discussed with regard to the claim shell chamber 2626 and cable- and power-tether-shielding 2624, in FIGS. 30-31, and also discussed with regard to the end-capped enclosure embodiments, as shown in FIGS. 13-19.

As shown in FIGS. 32-34, the power tethers 2616 are blunt-ended for field install or connectorization, but, in other embodiments, the power tethers 2616 may be factory connectorized.

In other contemplated embodiments, the sheath of the distribution cable 2612, at the end of the cable, is removed for approximately 5-6 feet, the conductive elements (e.g., power leads) are bundled in pairs with a UV resistance tube or heat shrink, the optical fibers are cut to approximately 8 inches in length (from the sheath) and prepared and spliced into a fiber optic tether 2616, a pulling grip 2618 is attached to the central strength member of the distribution cable. The assembly 2610 may then be overmolded.

The construction and arrangements of the hybrid cable assembly, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A cable assembly, comprising:
   a hybrid cable comprising:
   electrical-conductor elements comprising wire conductors;
   fiber-optic elements comprising optical fibers; and
   conductive armor providing a ground path of the hybrid cable;
   one or more fiber-optic tethers comprising optical fibers optically coupled to the optical fibers of the hybrid cable;
   electrical tethers coupled to the electrical-conductor elements of the hybrid cable, wherein the electrical tethers include a conductive shielding surrounding wire conductors electrically connected to the conductive armor of the hybrid cable,
   a chamber within which the wire conductors of the electrical tethers are coupled to the electrical-conductor elements of the hybrid cable and the optical fibers of the fiber-optic tethers are optically coupled to the optical fibers of the hybrid cable, wherein space within the chamber, unoccupied by fiber optic and conductive components, is filled with a dielectric filler; wherein the chamber electrically connects the conductive shielding of the electrical tethers to the conductive armor of the hybrid cable, thereby providing grounding for the assembly, and wherein the chamber is formed from a conductive material that serves as the electrical conductor connecting the shielding of the electrical tethers to the conductive armor of the hybrid cable; and an overmold surrounding the chamber, wherein the overmold is polymeric and provides flexibility to the assembly; and wherein the overmold is elongate, having a length at least five times the largest cross-sectional dimension of the overmold transverse to the length, whereby the overmold has a low profile configured to pass through narrow ducts.

2. The assembly of claim 1, wherein the chamber comprises a clam shell structure, including two parts that fasten together to form an enclosure for the chamber therein.

3. The assembly of claim 1, wherein the hybrid cable has a diameter, and wherein the largest cross-sectional dimension of the overmold orthogonal to the length thereof is less than five times the diameter of the hybrid cable.

4. The assembly of claim 1, wherein the largest cross-sectional dimension of the overmold orthogonal to the length thereof is less than 5 inches, such that the overmold is capable of passage through a 5-inch round duct or opening.

5. The assembly of claim 4, wherein the largest cross-sectional dimension of the overmold orthogonal to the length thereof is less than 3 inches, such that the overmold is capable of passage through a 3-inch round duct or opening.

6. The assembly of claim 1, wherein the electrical-conductor elements of the hybrid cable include stranded copper conductors.

7. The assembly of claim 1, wherein the electrical tethers comprise relatively high-capacity conductors in a range of 10 American wire gauge (AWG) to 1/0 AWG.

8. The assembly of claim 1, wherein the conductive armor is a copper or aluminum armor.

9. The assembly of claim 1, wherein the chamber simultaneously: (1) secures a splicing area to protect a splice location for electrical-conductor and fiber-optic elements of the hybrid cable, (2) structurally supports attachment of the one or more fiber-optic tethers and electrical tethers to the cable, (3) provides a ground path between conductive shielding of the electrical-conductor tethers and the conductive armor of the hybrid cable, and (4) maintains shielding across the splicing area.

10. A cable assembly, comprising:
a hybrid cable comprising:
electrical-conductor elements comprising wire conductors;
fiber-optic elements comprising optical fibers; and
conductive armor providing a ground path of the hybrid cable;
one or more fiber-optic tethers comprising optical fibers optically coupled to the optical fibers of the hybrid cable;
electrical tethers coupled to the electrical-conductor elements of the hybrid cable, wherein the electrical tethers include a conductive shielding surrounding wire conductors electrically connected to the conductive armor of the hybrid cable,
a chamber within which the wire conductors of the electrical tethers are coupled to the electrical-conductor elements of the hybrid cable and the optical fibers of the fiber-optic tethers are optically coupled to the optical fibers of the hybrid cable; wherein the chamber electrically connects the conductive shielding of the electrical tethers to the conductive armor of the hybrid cable, thereby providing grounding for the assembly, wherein the chamber is formed from a conductive material that serves as the electrical conductor connecting the shielding of the electrical tethers to the conductive armor of the hybrid cable; and wherein the chamber simultaneously: (1) secures a splicing area to protect a splice location for electrical-conductor and fiber-optic elements of the hybrid cable, (2) structurally supports attachment of the one or more fiber-optic tethers and electrical tethers to the cable, (3) provides a ground path between conductive shielding of the electrical-conductor tethers and the conductive armor of the hybrid cable, and (4) maintains shielding across the splicing area; and
an overmold surrounding the chamber, wherein the overmold is polymeric and provides flexibility to the assembly; and wherein the overmold is elongate, having a length at least five times the largest cross-sectional dimension of the overmold transverse to the length, whereby the overmold has a low profile configured to pass through narrow ducts.

11. The assembly of claim 10, wherein the hybrid cable has a diameter, and wherein the largest cross-sectional dimension of the overmold orthogonal to the length thereof is less than five times the diameter of the hybrid cable.

12. The assembly of claim 10, wherein the largest cross-sectional dimension of the overmold orthogonal to the length thereof is less than 5 inches, such that the overmold is capable of passage through a 5-inch round duct or opening.

13. The assembly of claim 12, wherein the largest cross-sectional dimension of the overmold orthogonal to the length thereof is less than 3 inches, such that the overmold is capable of passage through a 3-inch round duct or opening.

14. The assembly of claim 10, wherein the electrical-conductor elements of the hybrid cable include stranded copper conductors.

15. The assembly of claim 10, wherein the electrical tethers comprise relatively high-capacity conductors in a range of 10 AWG to 1/0 AWG.

16. The assembly of claim 10, wherein the conductive armor is a copper or aluminum armor.

17. The assembly of claim 10, wherein the chamber comprises a clam shell structure, including two parts that fasten together to form an enclosure for the chamber therein.

18. A cable assembly, comprising:
a hybrid cable having a diameter, the hybrid cable comprising:
electrical-conductor elements comprising wire conductors;
fiber-optic elements comprising optical fibers; and
conductive armor providing a ground path of the hybrid cable, wherein the conductive armor is a copper or aluminum armor;
one or more fiber-optic tethers comprising optical fibers optically coupled to the optical fibers of the hybrid cable;
electrical tethers coupled to the electrical-conductor elements of the hybrid cable, wherein the electrical tethers comprise conductors in a range of 10 AWG to 1/0 AWG, wherein the electrical tethers include a conductive shielding surrounding wire conductors electrically connected to the conductive armor of the hybrid cable,
a chamber within which the wire conductors of the electrical tethers are coupled to the electrical-conductor elements of the hybrid cable and the optical fibers of the fiber-optic tethers are optically coupled to the optical fibers of the hybrid cable, and wherein space within the chamber is filled with a dielectric filler; and
an overmold surrounding the chamber, wherein the overmold is polymeric and provides flexibility to the assembly; and wherein the overmold is elongate, having a length at least five times the largest cross-sectional dimension of the overmold transverse to the length, whereby the overmold has a low profile configured to pass through narrow ducts; wherein the largest cross-sectional dimension of the overmold orthogonal to the length thereof is less than five times the diameter of the hybrid cable.

19. The assembly of claim 18, wherein the largest cross-sectional dimension of the overmold orthogonal to the length thereof is less than 5 inches, such that the overmold is capable of passage through a 5-inch round duct or opening.

20. The assembly of claim 18, wherein the chamber comprises a clam shell structure, including two parts that fasten together to form an enclosure for the chamber therein.

* * * * *